(12) United States Patent
Furukawa et al.

(10) Patent No.: US 7,557,803 B2
(45) Date of Patent: Jul. 7, 2009

(54) METHOD, COMPUTER PROGRAM PRODUCT AND DATA STRUCTURE FOR REPRESENTING TWO- OR THREE-DIMENSIONAL OBJECT MODELING

(75) Inventors: Susumu Furukawa, 3-8-23 Yakata, Yamanashi, Kofu-shi (JP); Seiji Shimizu, Kofu-shi (JP); Shinji Mukai, Maebashi-shi (JP); Yutaka Hara, Iida-shi (JP); Hroko Monma, Tokyo (JP); Mamoru Fukushima, Kai-shi (JP)

(73) Assignees: Susumu Furukawa, Kofu-Shi (JP); Nihon Soar Co., Ltd., Tokyo (JP)

( * ) Notice: Subject to any disclaimer, the term of this patent is extended or adjusted under 35 U.S.C. 154(b) by 58 days.

(21) Appl. No.: 11/113,130

(22) Filed: Apr. 25, 2005

(65) Prior Publication Data
US 2006/0010141 A1 Jan. 12, 2006

(30) Foreign Application Priority Data
Apr. 23, 2004 (JP) ............................. 2004-129092
Sep. 14, 2004 (JP) ............................. 2004-267550

(51) Int. Cl.
*G06F 17/00* (2006.01)
*G06T 1/00* (2006.01)
*G06T 15/00* (2006.01)
*G06T 17/00* (2006.01)

(52) U.S. Cl. ...................................... 345/420; 345/419
(58) Field of Classification Search .................. 345/420
See application file for complete search history.

(56) References Cited

U.S. PATENT DOCUMENTS

| | | | | |
|---|---|---|---|---|
| 5,237,647 A | * | 8/1993 | Roberts et al. | 345/419 |
| 5,506,580 A | * | 4/1996 | Whiting et al. | 341/51 |
| 5,561,754 A | * | 10/1996 | Oliver et al. | 345/441 |
| 5,592,599 A | * | 1/1997 | Lindholm | 345/427 |
| 5,768,586 A | * | 6/1998 | Zweben et al. | 713/100 |
| 5,850,223 A | * | 12/1998 | Fujita et al. | 345/420 |
| 5,896,139 A | * | 4/1999 | Strauss | 345/440 |

(Continued)

OTHER PUBLICATIONS

Ferguson, Stuart R.; "Practical Algorithms for 3D Computer Graphics;" 2001; A K Peters, Ltd; pp. 63-85.*

(Continued)

*Primary Examiner*—Kee M Tung
*Assistant Examiner*—Crystal Murdoch
(74) *Attorney, Agent, or Firm*—Young & Thompson

(57) ABSTRACT

A data structure for a graph, which is composed by points and line segments connecting adjacent pairs of the points, respectively, of a two- or three-dimensional object comprises a set of point data of the individual points, each of the point data of the points consists of a clockwise or counter clockwise circular ordered adjacency list written in storage areas of a storage medium individually allocated to the point. The adjacency list describes a plurality of adjacent points associated with the point sequentially according to a circular adjacency order as viewed from outside of the graph with address pointers to the storage areas allocated to the adjacent points, respectively, and location pointers associated with the address pointers, respectively, to storage locations of adjacency lists of the adjacent points, respectively, where an address pointer of the point is written.

18 Claims, 31 Drawing Sheets

Level 2

U.S. PATENT DOCUMENTS

| | | | |
|---|---|---|---|
| 5,945,996 A * | 8/1999 | Migdal et al. | 345/420 |
| 5,966,141 A * | 10/1999 | Ito et al. | 345/473 |
| 5,999,192 A * | 12/1999 | Selfridge et al. | 345/440 |
| 6,208,347 B1 * | 3/2001 | Migdal et al. | 345/419 |
| 6,226,405 B1 * | 5/2001 | Furuhata et al. | 382/197 |
| 6,252,876 B1 * | 6/2001 | Brueckheimer et al. | 370/394 |
| 6,262,737 B1 * | 7/2001 | Li et al. | 345/419 |
| 6,611,267 B2 * | 8/2003 | Migdal et al. | 345/428 |
| 6,707,452 B1 * | 3/2004 | Veach | 345/423 |
| 6,963,824 B1 * | 11/2005 | Davidson et al. | 703/2 |
| 6,996,793 B1 * | 2/2006 | Kronmiller et al. | 716/9 |
| 7,076,483 B2 * | 7/2006 | Preda et al. | 707/5 |
| 7,098,916 B1 * | 8/2006 | Khodakovsky et al. | 345/428 |
| 7,099,803 B1 * | 8/2006 | Rappoport et al. | 703/1 |
| 7,117,468 B1 * | 10/2006 | Teig et al. | 716/11 |
| 2002/0050988 A1 * | 5/2002 | Petrov et al. | 345/418 |
| 2002/0050992 A1 * | 5/2002 | Deering | 345/423 |
| 2002/0089508 A1 * | 7/2002 | Sowizral et al. | 345/522 |
| 2004/0006763 A1 * | 1/2004 | Van De Vanter et al. | 717/110 |
| 2004/0034514 A1 * | 2/2004 | Langemyr et al. | 703/2 |
| 2004/0119724 A1 * | 6/2004 | Hawksworth | 345/626 |
| 2004/0257363 A1 * | 12/2004 | Veach | 345/423 |
| 2005/0021318 A1 * | 1/2005 | Inoue et al. | 703/2 |
| 2005/0091223 A1 * | 4/2005 | Shaw et al. | 707/100 |
| 2005/0097108 A1 * | 5/2005 | Wang et al. | 707/100 |
| 2006/0077909 A1 * | 4/2006 | Saleh et al. | 370/254 |
| 2006/0101452 A1 * | 5/2006 | Mak | 717/168 |
| 2006/0284871 A1 * | 12/2006 | Kee et al. | 345/423 |

OTHER PUBLICATIONS

Collected papers at lecture meeting: Yamanashi District Conference, Japan Society of Precision Engineering, Oct. 25, 2003.

Collected papers at lecture meeting: 13$^{th}$ Design & System Conference, Japan Society of Mechanical Engineering, Oct. 30, 2003.

Collected papers at lecture meeting: Annual Conference, Japan Society of Precision Engineering, Spring 2004.

Guidebook 10$^{th}$ anniversary Nationwide Conference of Foundation, Society of Fashion Business, Nov. 23, 2003.

* cited by examiner

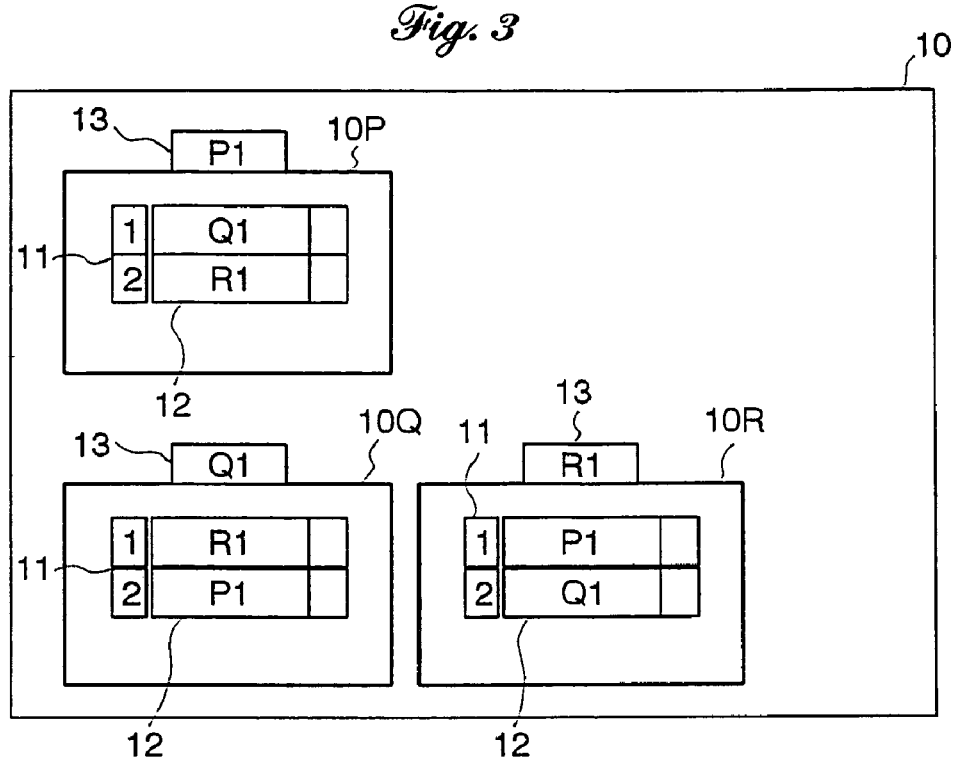
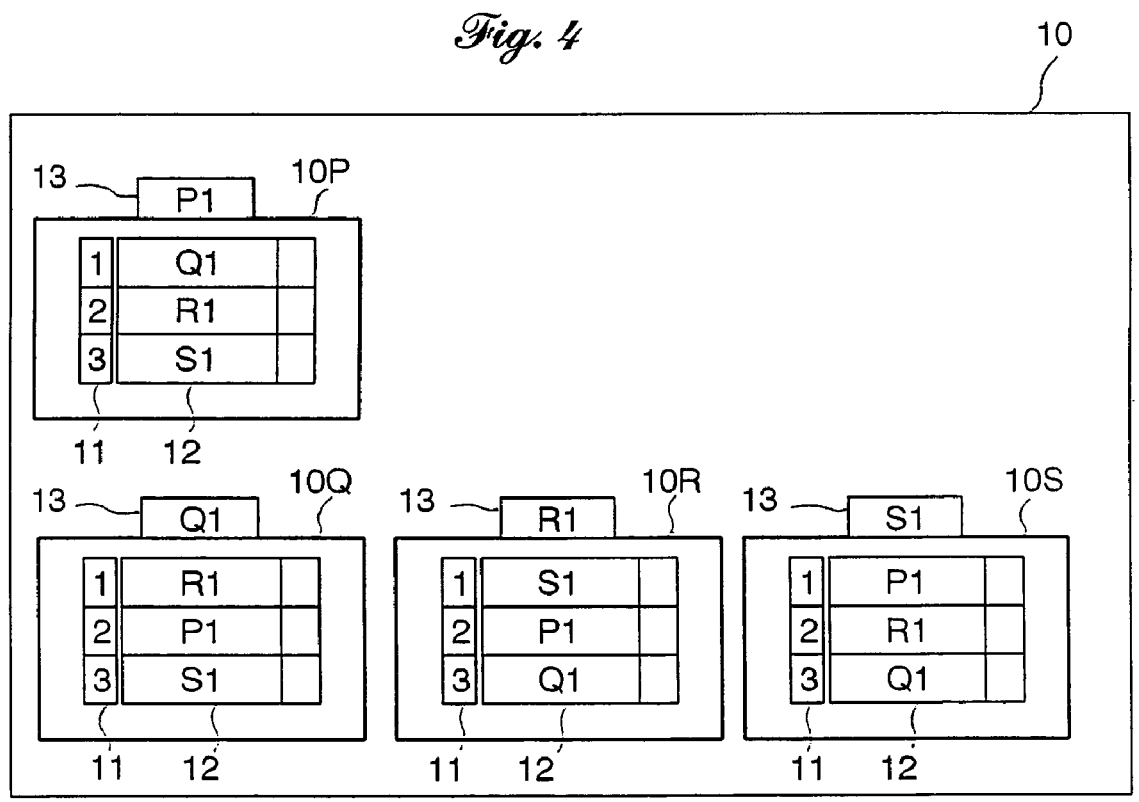

Level 1

Level 2

Level 3

Level 1

Level 2

Level 3

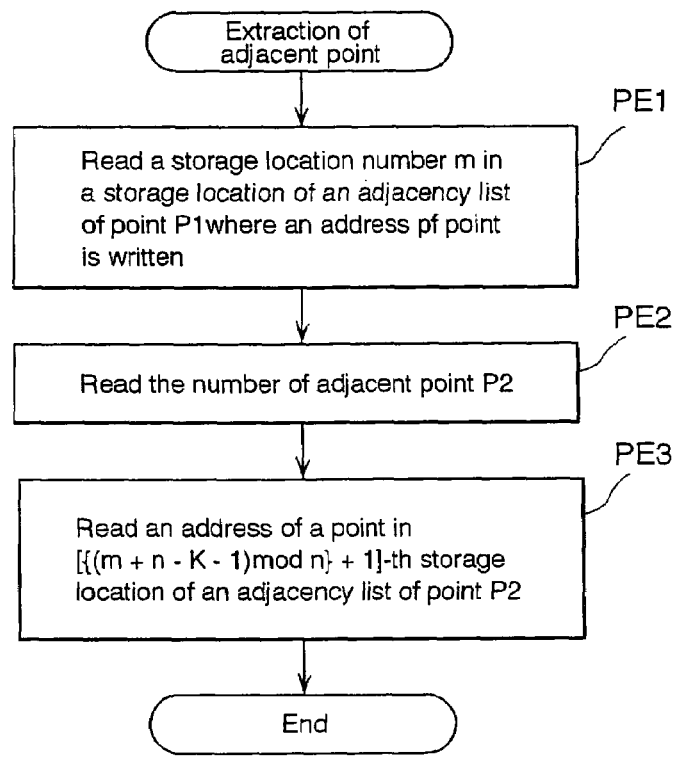
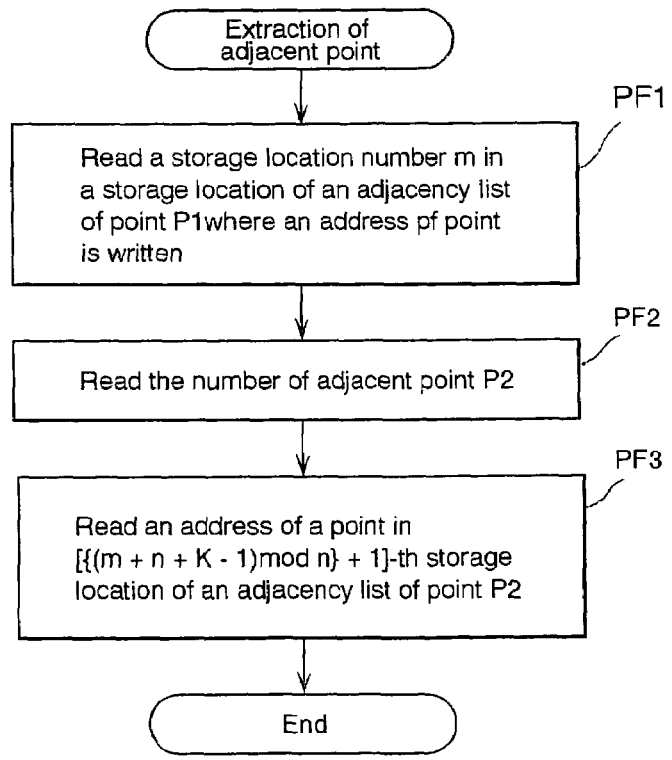

Fig. 39
*Prior Art*
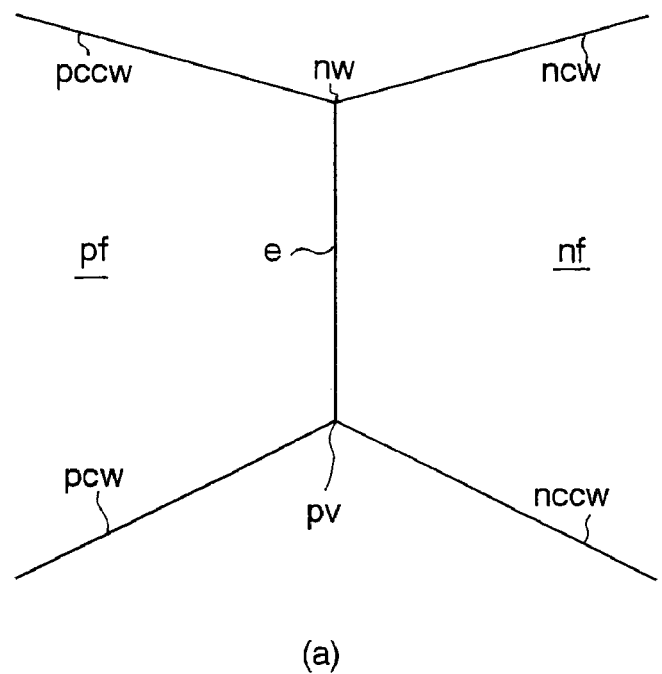
(a)
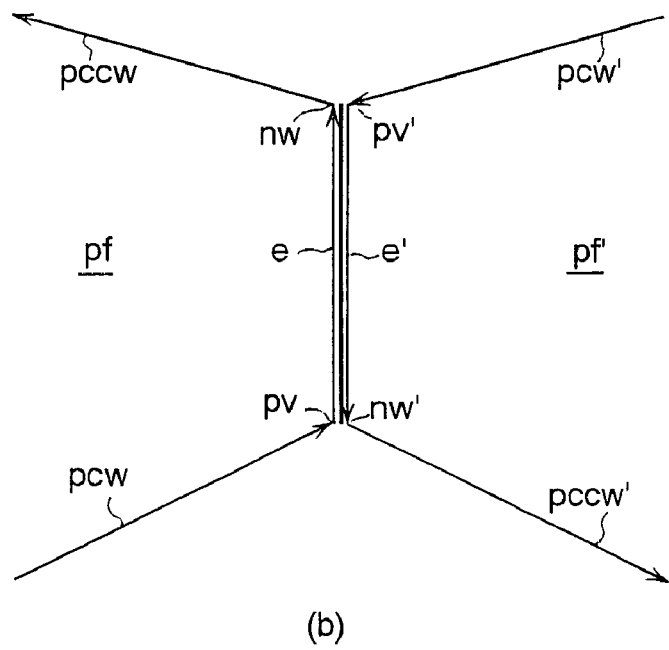
(b)

METHOD, COMPUTER PROGRAM PRODUCT AND DATA STRUCTURE FOR REPRESENTING TWO- OR THREE-DIMENSIONAL OBJECT MODELING

BACKGROUND OF THE INVENTION

1. Field of the Invention

The present invention relates to a method, a computer program product and a data structure for a representation of graphical information of a two- or three-dimensional object.

2. Description of Related Art

In recent years, it plays a key role in various fields including design and production using computer-assisted design (CAD) system and/or computer-assisted manufacturing (CAM) system, environmental recognition techniques of robots, various scientific simulations, computer graphics, and the like to perform graphics data processing on a computer display image for two- or three-dimensional object modeling and to store the data representing the graphics information structured in a specific form on a storage medium capable of being accessed and read by a computer. In particular, there have been proposed, in the technical field of CAD/CAM system, a variety of data structures for storing and saving edited graphics on a storage medium.

Data structures composed of data items of point and edges are widely used to represent graphs for modeling of polygonal or two-dimensional objects or polyhedral or three-dimensional objects in early CAD systems. However, as the capacity of computer memory was increased dramatically resulting from rapid development of computer technology, a recent tendency is toward employing an application-oriented representational form of data structures capable of allowing data to be relatively redundant so as to allow provision of voluminous information and easy and short-time data processing. A basic data structure that is nowadays most-widely used in CAD systems is what is called a half-edge data structure that is an advanced, predigested data structure of the winged-edge data structure propounded by B. G. Baumgart. The half-edge data structure is capable of flexibly data processing for modeling of polyhedral or solid models.

Reference is made to FIG. 39 showing conceptual illustration for ease of explanation of the prior art half-edge data structure for a representation of polyhedral solid modeling for the purpose of providing an outline architecture of half-edge structure that will enhance an understanding of a point-based data structure of the present invention. A polyhedral solid generally has two adjacent faces, namely a face pf that is closed edges pccw, e, pcw and other edges, and a face nf that is closed by edges ncw, e, nccw and other edges, as shown (a) in FIG. 39. A vertex nw is an intersection between the edges ppcw, e and ncw. A vertex pv is an intersection between the edges pcw, e and nccw. The adjacency of the edges around the vertex forms a circular-ordered list. In other words, the half-edge structure represents adjacency information of the edge e by splitting it into two edge structures e and e', each related to one of the two edge ends which is adjacent to other edge ends around a vertex. More specifically, the half-edge data structure gives the edge e an upward direction and the edge e' a downward direction and represents adjacency relationships of the edges pcw, e and pccw of the face pf and adjacency relationships of the edges ncw, e' and pccw' of the face pf' as viewed from outside the solid volume looking toward the surface.

Although the half-edge data structure has a high degree of redundancy, it has been universally applied for interactive solid modeling through CAD because of the possibility of efficient data processing and short-time requirement for creation of an executable program.

However, it is very troublesome to represent a graph of a three-dimensional solid object having planar and curved surfaces even by the half-edge data structure. This is because planer and curved surfaces are represented in different data formats and, in consequence, it is hard pressed to bring data for interface between these planar and curved surfaces consistency with each other. In addition, it is considerably time and energy-consuming to create a program, besides the program itself and data spend a huge storage space.

There have been proposed CAM systems that are designed to represent a graph as close as having an imaginarily precise interface between planer and curved surfaces only for vision and display purpose. In such a system, the representation is not a physical solid model, an adverse consequence is encountered in the case of determining a tool path or rout for numerically controlled machine tools.

The data manipulation of a representation of a curved surface is an extremely intractable job. When defining a quadratic surface by an algebraic function, it is essential to provide data for a representation of a domain of function to which constants or variables of the algebraic function are valid. In particular, when defining a quadratic surface by a spline curve, a B-spline curve, or a Non-Uniformed Rotational B-Spline (NURBS) curve, data should contain coordinate information on control points of the curve or passing points of the curve. Further, when analyzing a curved surface by splitting it into diagonal segments that are impossible to lie in a matrix pattern, it is necessary to have an extraordinary data structure available.

Further, it has become routine with holding alteration history information in conventional interactive graph representations that, when executing a command to cancel a job or to retrieve the cancelled job, it is essential to start the job over again according to a given command history that is hold separately from the graphic data or to execute a counter command to produce the same effect as a cancel of the job if the immediately preceding command is reversible. There have been proposed data structures capable of holding alteration history information therein. Such a data structure encounters a decline in data processing efficiency and, in consequence, less utilized in CAD systems.

In order to manipulate an embedded geometric graph of a two- or three-dimensional object represented data structures with a computer, one has no other choice than coping with required processes with different types of data structures according to complex configuration of an object. This forces the computer to store huge volumes of data and results in less data processing efficiency.

There have been proposed surface-based data structures along with the edge-based data structures as described above. However, even these surface-based data structures are so far not always suitable for a representation of a curved surface. Almost of the existing data structure are incapable of manipulating planar and curved surfaces and/or an interface between two or more curved surfaces in a unified form in the case of a graph representations of a polyhedral solid object with a number of curved surfaces intricately arranged or of a polyhedral solid object with mixed planar and curved surfaces. Therefore, there are still many problems of intractable curved surface to be broken through. Furthermore, as concerns alteration history of a graph, the conventional data structures requires a flood of geometric data, a quantitative increase of data is notable with respect to each alteration and, in consequence, encounters a problem of inefficient data processing.

SUMMARY OF THE INVENTION

It is therefore an object of the present invention to provide a data structure enabling unified data manipulation that requires no troublesome data manipulation, is of a light workload and achieves a significant decrease in storage requirement.

It is another object of the present invention to provide a computer program product for manipulating a data structure for a representation of a two- or three-dimensional graph composed by points and line segments connecting adjacent pairs of the points, respectively.

The foregoing objects of the present invention are accomplished by a data structure for a representation of topological and geometrical information of a two- or three-dimensional object, that is embedded in a storage medium capable of being accessed and read by a computer or a processor-controlled machine. A graph represented by the data structure consists of points and line segments connecting adjacent pairs of the points, respectively. The data structure comprises a set of point data of the individual points for a representation of topological information of the graph, the point data of each point consisting of an adjacency list written in an storage area of the storage medium individually allocated to the point, wherein the adjacency list describes a plurality of adjacent points associated with the point sequentially according to a predetermined rule, namely circular order either in either clockwise direction or in counterclockwise direction with a center on the each the point as viewed from outside of the graph. The data structure preferably represents information on a current alteration level of the graph and the point data contains information on a log of alteration levels of the point. The alteration level of the graph changed by one increment every time any one of the points is altered once.

According to the data structure enables graphic data for representing a graph of a two- or three-dimensional object with planar and curved surfaces in a unified form and significantly decrease storage requirement of a storage medium.

The foregoing objects of the present invention are also accomplished by the computer program product for manipulating a data structure for a representation of a two- or three-dimensional graph composed by points and line segments connecting adjacent pairs of the points, respectively, by the use of a data structure consisting of a set of point data of the individual points for a representation of topological information of the graph, the point data of each point consisting of an adjacency list, The computer program product comprises a computer usable storage medium, computer readable addressing instructions embedded in the computer readable medium for directing the computer to reserve storage areas in the computer usable storage medium in which the adjacency lists of the individual points are written, respectively, and computer readable read/write instructions embedded in the computer readable medium for directing the computer to perform the steps of writing addresses of a plurality of adjacency points of each the point in the storage area allocated to the each point in sequentially according to a predetermined rule as address pointers to the storage areas allocated to the adjacent points, and reading the address pointers. The computer program product preferably further comprises instructions for directing the computer to perform the steps of writing a sequential numerical value, as a location pointer, in association with each address pointer, the sequential numerical value indicating a sequenced storage location of the storage area allocate to the adjacent point indicated by the address pointer where an address pointer to the storage area allocated to the point is written, and reading the location pointers.

BRIEF DESCRIPTION OF THE DRAWINGS

The foregoing and other objects and features of the present invention will be clearly understood from the following detailed description when reading with reference to the accompanying drawings, wherein the same reference signs have been used to denote same or similar parts throughout the drawings, and in which:

FIG. 3 is a conceptual illustration of a basic data structure for a graph representation of the two-dimensional object shown in FIG. 1 which consists of topological or ordered adjacency information of individual constitutive points;

FIG. 4 is a conceptual illustration of a basic data structure for a graph representation of the three-dimensional solid object shown in FIG. 2 which consists of topological or adjacency information of individual constitutive points;

FIG. 16 is a flow chart illustrating a process of retrieving any one of adjacent points of a given constitutive points in a counterclockwise direction;

FIG. 17 is a flow chart illustrating a process of retrieving any one of adjacent points of a given constitutive points in a counterclockwise direction;

FIG. 39 is an illustration for explanation of a prior art half-edge data structure.

DETAILED DESCRIPTION OF THE PREFERRED EMBODIMENTS

The term "constitutive point" as used herein shall mean and refer to each of the constitutive points by which a graph is defined. The term "adjacent point" as used herein shall mean and refer to one of endpoints of a line segment, a straight line or a curved line, relative to another endpoint of the line segment. In other words, opposite endpoints of a line segment are directly adjacent relatively to each other. The term "point data" of a constitutive point as used herein shall mean and refer to the data for a representation of topological and geometric information of constitutive point of a graph.

Figure 1:
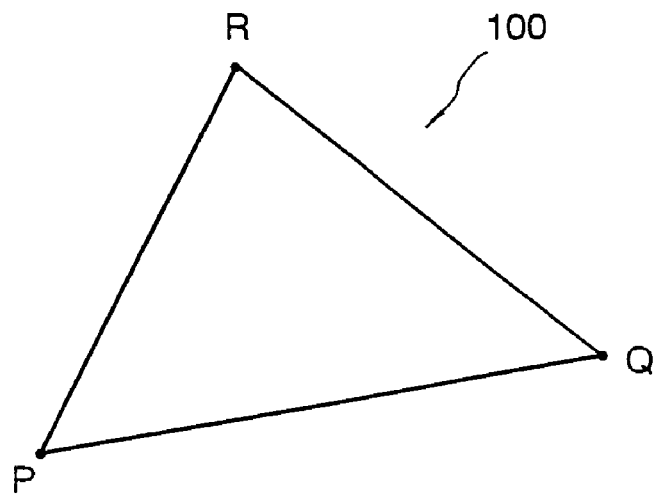
FIG. 1 is a graph representation of a two-dimensional object by a data structure according to an embodiment of the present invention.
Figure 2:
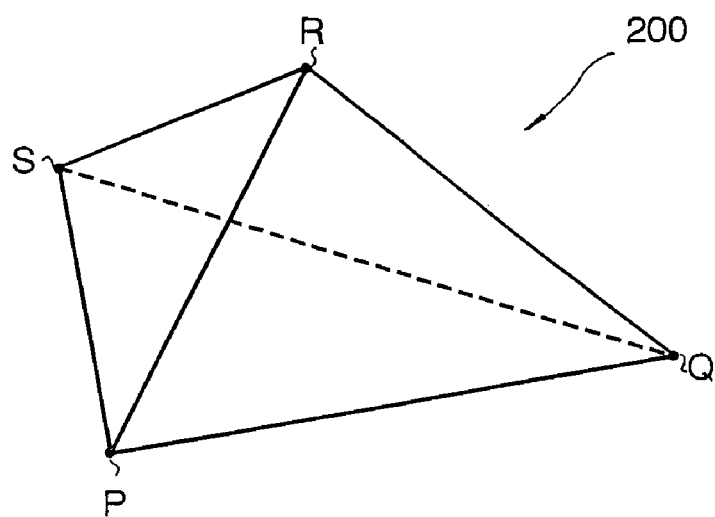
FIG. 2 is a graph representation of a three-dimensional solid object by a data structure according to the embodiment of the present invention.

Referring to the accompanying drawings in detail, and, in particular, to FIGS. 1 and 2 illustrating an embedded graph representation of a polygonal or two-dimensional object (which is hereafter referred to as a graph for simplicity)100, namely a triangle PQR, and an embedded graph representation of a polyhedral or three-dimensional object (which is hereafter referred to as a graph for simplicity) 200, namely a tetrahedron PQRS, respectively.

As shown in FIG. 1, the triangle PQR has three vertices, which are referred to as constitutive points, P, Q and R. The constitutive point P has an adjacent points Q and R around the constitutive point P in circular order as viewed in a counterclockwise direction from outside the graph (counterclockwise circular adjacency order). Similarly, the constitutive point Q has adjacent points R and P around the constitutive point Q in the counterclockwise circular adjacency order, and the constitutive point R has adjacent points P and Q around the constitutive point R in the counterclockwise circular adjacency order.

As shown in FIG. 2, the tetrahedron PQRS has four vertices or constitutive points P, Q, R and S. The constitutive point P has adjacent points Q, R and S in circular order as viewed in a counterclockwise direction from outside the graph (which is hereafter referred to as counterclockwise circular adjacency order). Similarly, the constitutive point Q has adjacent points R, P and S in the counterclockwise circular adjacency order, the constitutive point R has adjacent points S, P and Q in the counterclockwise circular adjacency order, and the constitutive point S has adjacent points P, R and Q in the counterclockwise circular adjacency order.

The data structure for a representation of the two- or three-dimensional object in accordance to an embodiment of the present invention consists of a set of point data of constitutive points that describe adjacency relationships of the individual constitutive points as topological information. The adjacency relationship associated with a constitutive point is described in the form of a circular-ordered adjacency list of the constitutive point.

FIG. 3 schematically illustrates a conceptual configuration of the data structure for a representation of the graph 100, namely the triangle PQR, shown in FIG. 1. The data structure consists of a set of point data of the individual constitutive points P, Q and R for a representation of topological information, namely adjacency relationships of the individual constitutive points, in this embodiment. The point data of the constitutive points P, Q and R are assigned distinctive addresses P1, Q1 and R1, respectively, as denoted by a reference numeral 13, so as to reserve unoccupied storage areas 10P, 10Q and 10R, each having a sufficient storage capacity, in a storage area 10 of a storage medium, respectively. The addresses P1, Q1 and R1 may or may not be sequenced in the storage area 10. The point data of the constitutive point P represents circular order of the adjacent points Q and R around the constitutive point P as viewed in a counterclockwise direction outside from the graph 100, specifically, in the form of a circular-ordered adjacency list 12. The circular-ordered adjacency list 12 of the constitutive point P describes the addresses Q1 and R1, as pointers to storage locations at these addresses (which are hereinafter referred to as address pointers), of the adjacent points Q and R around the constitutive point P in this order. The address pointers Q1 and R1 are written in sequenced storage locations denoted by a reference number 11, namely first and second storage locations 1 and 2 that are used for explanatory purpose only and are not constitutive parts of the point data, in the storage area 10P, respectively, in conformity with the counterclockwise circular adjacency order. Similarly, the circular-ordered adjacency list 12 of the constitutive point Q describes the addresses, or pointers to these addresses, respectively, R1 and P1 of the adjacent points R and P, respectively, around the constitutive point Q in this order. The address pointers R1 and P1 are written in sequenced storage locations denoted by a reference number 11, namely first and second storage locations 1 and 2, in the storage area 10Q, respectively, in conformity with the counterclockwise circular adjacency order. The circular-ordered adjacency list 12 of the constitutive point R describes the addresses, or pointers to these addresses, respectively, P1 and Q1 of the adjacent points P and Q, respectively, around the constitutive point R in this order. The address pointers P1 and Q1 are written in sequenced storage locations denoted by a reference number 11, namely first and second storage locations 1 and 2, in the storage area 10R, respectively, in conformity with the counterclockwise circular adjacency order.

FIG. 4 schematically illustrates a conceptual configuration of the data structure for a representation of the graph 200, namely the tetrahedron PQRS, shown in FIG. 2. The data structure consists of a set of point data of the individual constitutive points P, Q and R for a representation of topological information, namely adjacency relationships of the individual constitutive points, in this embodiment. The point data of the constitutive points P, Q, R and S are assigned distinctive addresses P1, Q1, R1 and S1, respectively, as denoted by a reference numeral 13, so as to reserve unoccupied storage areas 10P, 10Q, 10R and 10S, each having a sufficient storage capacity, in a storage area 10 of a storage medium, respectively. The point data of the constitutive point P represents circular order of the adjacent points Q, R and S around the constitutive point P as viewed in a counterclockwise direction outside from the graph 200, specifically, in the form of a circular-ordered adjacency list 12. The circular order may be in the order of R, S and Q or of S, Q and R in a counterclockwise direction. The circular-ordered adjacency list 12 of the constitutive point P describes the addresses, or pointers to these addresses, respectively, Q1, R1 and S1 of the adjacent points Q, R and S, respectively, around the constitutive point P in this order. The address pointers Q1, R1 and S1 are written in sequenced storage locations denoted by a reference number 11, namely first, second and third storage locations 1, 2 and 3 that are used for explanatory purpose only and are not constitutive parts of the point data, in the storage area 10P, respectively, in conformity with the counterclockwise circular adjacency order. As long as maintaining the circular order of the adjacent points Q, R and S, the address of any adjacent point may be written in the first storage location 1. Similarly, the circular-ordered adjacency list 12 of the constitutive point Q describes the addresses, or pointers to these addresses, respectively, R1, P1 and S1 of the adjacent points R, P and S, respectively, around the constitutive point Q in this order. The address pointers R1, P1 and S1 are written in sequenced storage locations denoted by a reference number 11, namely first second and third storage locations 1, 2 and 3, in the storage area 10Q, respectively, in conformity with the counterclockwise circular adjacency order. The circular-ordered adjacency list 12 of the constitutive point R describes the addresses, or pointers to these addresses, respectively, S1, P1 and Q1 of the adjacent points, S, P and Q, respectively, around the constitutive point R in this order. The address pointers S1, P1 and Q1 are written in sequenced storage locations denoted by a reference number 11, namely first, second and third storage locations 1, 2 and 3, in the storage area 10R, respectively, in conformity with the counterclockwise circular adjacency order. Further, the circular-ordered adjacency list 12 of the constitutive point S describes the addresses, or pointers to these addresses, respectively, P1, R1 and Q1 of the adjacent points, P, R and Q, respectively, around the constitutive point S in this order. The address pointers P1, R1 and Q1 are written in sequenced storage locations denoted by a reference number 11, namely first second and third storage locations 1, 2 and 3, in the storage area 10S, respectively, in conformity with the counterclockwise circular adjacency order.

In this embodiment, the data structure represents only topological information of the constitutive points, so that the graph is indefinite in configuration and impossible to be imaged on a computer display for vision. However, when specifying each constitutive points with appropriate coordinate values, a virtual geometric graph can be determined according to the coordinate values. This is contributive to modeling, for example, a neuron network for the purpose of analyzing pathways of electrical signals from brain cells.

Figure 5:
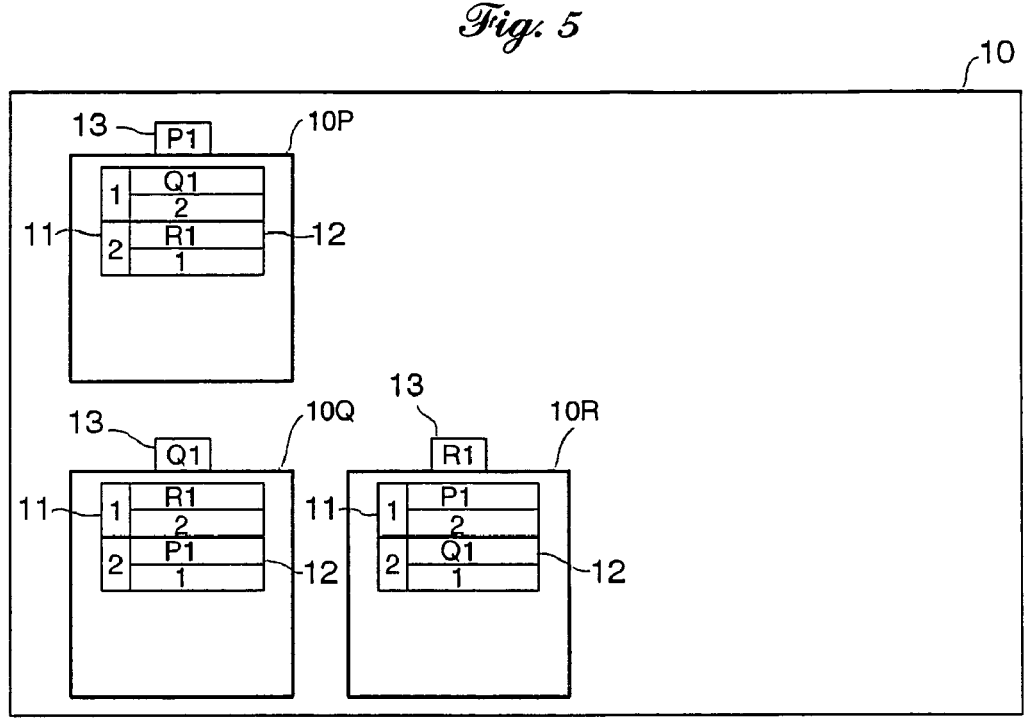
FIG. 5 is a conceptual illustration of a data structure for a graph representation of the two-dimensional object shown in FIG. 1 according to another embodiment of the present invention which consists of topological or adjacency information including storage location information of individual constitutive points.
Figure 6:
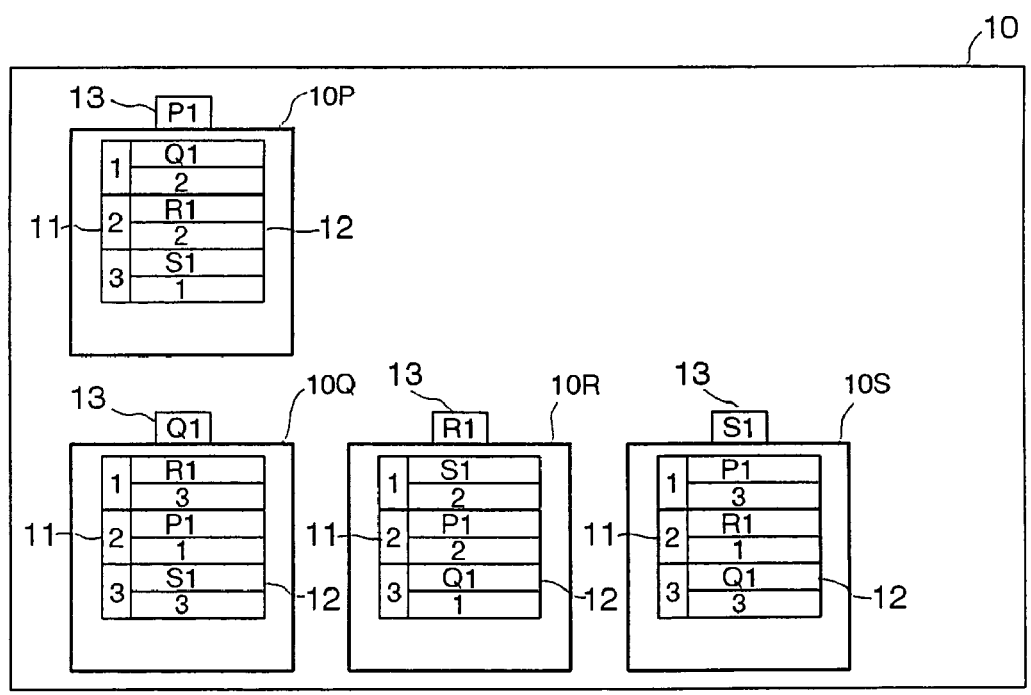
FIG. 6 is a conceptual illustration of a basic structure for a graph representation of the three-dimensional solid object shown in FIG. 2 according to the other embodiment of the present invention which consists of topological or adjacency information including storage location information of individual constitutive points.

FIGS. 5 and 6 illustrate data structures illustrate data structure for a representation of topological information of a two- or thee-dimensional object in accordance to another embodiment of the present invention. In the data structure according to this embodiment, the circular-ordered adjacency list of a constitutive point describes addresses of adjacent points around the constitutive point, or pointers to these address pointers, respectively, and information on sequenced storage locations in which the addresses of the adjacent points of the constitutive point are written as address pointers in the storage area allocated to the adjacent points, respectively.

Referring to FIG. 5 schematically illustrating a conceptual configuration of the data structure for a representation of topological information of the graph 100, the triangle PQR, shown in FIG. 1, the data structure consists of a set of point data of the individual constitutive points P, Q and R for a representation of topological information, namely adjacency relationships of the individual constitutive points P, Q and R. The point data of the constitutive points P, Q and R are assigned distinctive addresses P1, Q1 and R1, respectively, as denoted by a reference numeral 13, so as to reserve unoccupied storage areas 10P, 10Q and 10R, each having a sufficient storage capacity, in a storage area 10 of a storage medium, respectively. The addresses P1, Q1 and R1 may or may not be sequenced in the storage area 10. The point data of the constitutive point P represents a circular-ordered adjacency list of the constitutive point P that describes address pointers and numbers of sequenced storage locations (which are hereinafter referred to as storage location numbers) 2 and 1, respectively, in which the address pointers P1 are written in circular-ordered adjacency lists 10Q and 10R of the adjacent points Q and R, respectively. More specifically, the circular-ordered adjacency list 12 of the constitutive point P describes the address pointer Q1 in a first storage location 1 and the address pointer R1 in a second storage location 2, in conformity with the counterclockwise circular adjacency order. These address pointers Q1 and R1 are accompanied by a storage location number 2 indicating that the address pointer P1 is written in a second storage location 2 of the storage area 10Q allocated to the point data of the constitutive point Q and a storage location number 1 indicating that the address pointer P1 is written in a first storage location 1 of the storage area 10R allocated to the point data of the constitutive point R, respectively. Similarly, the circular-ordered adjacency list 12 of the constitutive point Q describes the address pointer R1 in a first storage location 1 and the address pointer P1 in a second storage location 2 in conformity with the counterclockwise circular adjacency order. These address pointers R1 and P1 are accompanied by a storage location number 2 indicating that the address pointer Q1 is written in a second storage location 2 of the storage area 10R allocated to the point data of the constitutive point R and a storage location number 1 indicating that the address Q1 is written in a first storage location 1 of the storage area 10P allocated to the point data of the constitutive point P, respectively. The circular-ordered adjacency list 12 of the constitutive point R describes the address pointer P1 in a first storage location 1 and the address pointer Q1 in a second storage location 2 in conformity with the counterclockwise circular adjacency order. These address pointers P1 and Q1 are accompanied by a storage location number 2 indicating that the address pointer R1 is written in a second storage location 2 of the storage area 10P allocated to the point data of the constitutive point P and a storage location number 1 indicating that the address pointer R1 is written in a first storage location 1 of the storage area 10Q allocated to the point data of the constitutive point Q, respectively.

Referring to FIG. 6 schematically illustrating a conceptual configuration of the data structure for a representation of topological information of the graph 200, namely the tetrahedron PQRS, shown in FIG. 2, the data structure consists of a set of point data of the individual constitutive points P, Q R and R for a representation of topological information, namely adjacency relationships of the individual constitutive points P, Q and R. The point data of the constitutive points P, Q, R and S are assigned distinctive addresses P1, Q1, R1 and S1, respectively, as denoted by a reference numeral 13, so as to reserve unoccupied storage areas 10P, 10Q, 10R and 10S, each having a sufficient storage capacity, in a storage area 10 of a storage medium, respectively. The addresses P1, Q1, R1 and S1 may or may not be sequenced in the storage area 10. The circular-ordered adjacency list 12 of the constitutive point P describes the address pointer Q1 in a first storage location 1, the address pointer R1 in a second storage location 2 and the address pointer S1 in a third storage location 3 in conformity with the counterclockwise circular adjacency order. These address pointer Q1, R1 and S1 are accompanied by storage location numbers 2, 2 and 1, respectively, which indicate that the address pointer P1 is written in a second storage location 2 of the storage area 10Q allocated to the point data of the constitutive point Q, a first storage location 1 of the storage area 10R allocated to the point data of the constitutive point R and a first storage location 1 of the storage area 10S allocated to the point data of the constitutive point S, respectively. Similarly, the circular-ordered adjacency list 12 of the constitutive point Q describes the address pointer R1 in a first storage location 1, the address pointer P1 in a second storage location 2 and the address pointer S1 in a third storage location 3 in conformity with the counterclockwise circular adjacency order. These address pointers R1, P1 and S1 are accompanied by storage location numbers 3, 1 and 3, respectively, which indicate that the address pointer Q1 is written in a third storage location 3 of the storage area 10R allocated to the point data of the constitutive point R, a first storage location 1 of the storage area 10P allocated to the point data of the constitutive point P and a third storage location 3 of the storage area 10P allocated to the point data of the constitutive point P, respectively. The circular-ordered adjacency list 12 of the constitutive point R describes the address pointer S1 in a first storage location 1, the address pointer P1 in a second storage location 2 and the address pointer Q1 in a third storage location 3 in conformity with the counterclockwise circular adjacency order. These address pointers S1, P1 and Q1 are accompanied by storage location numbers 2, 2 and 1, respectively, which indicate that the address pointer R1 is written in a second storage location 2 of the storage area 10S allocated to the point data of the constitutive point S, a second storage location 2 of the storage area 10P allocated to the point data of the constitutive point P and a first storage location 1 of the storage area 10Q allocated to the point data of the constitutive point Q, respectively. Further, the circular-ordered adjacency list 12 of the constitutive point S describes the address pointer P1 in a first storage location 1, the address pointer R1 in a second storage location 2 and the address pointer Q1 in a third storage location 3 in conformity with the counterclockwise circular adjacency order. These address pointers P1, R1 and Q1 are accompanied by storage location numbers 3, 1 and 3, respectively, which indicate that the address pointer S1 is written in a third storage location 3 of the storage area 10R allocated to the point data of the constitutive point P, a first storage location 1 of the storage area 10R allocated to the point data of the constitutive point R and a third storage location 3 of the storage area 10Q allocated to the point data of the constitutive point Q, respectively.

Although the data structure of this embodiment also represents only topological information of the constitutive points, a virtual geometric graph can be determined when specifying each constitutive points only with appropriate coordinate values as previously described. Furthermore, the data structure of this embodiment enables extraction of a partition or a sequence of constitutive points of the virtual geometric graph using the storage location numbers as will be described later.

Figure 7:
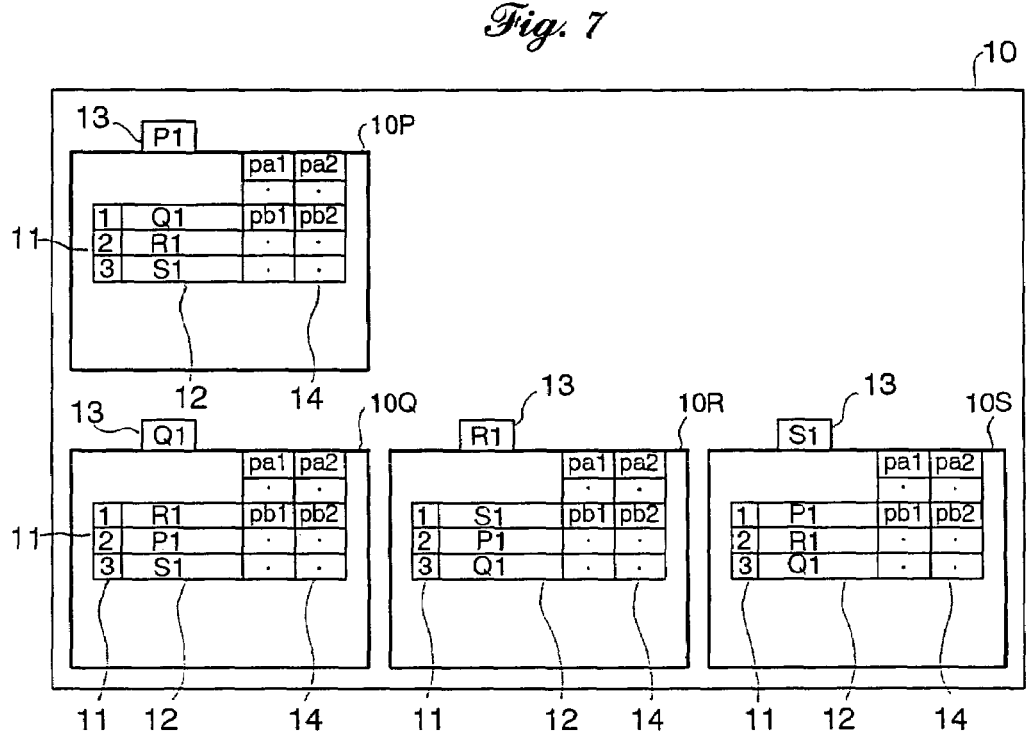
FIG. 7 is a conceptual illustration of a data structure for a graph representation of the three-dimensional solid object shown in FIG. 2 according to still another embodiment of the present invention which consists of topological and geometric information of individual constitutive points.
Figure 8:
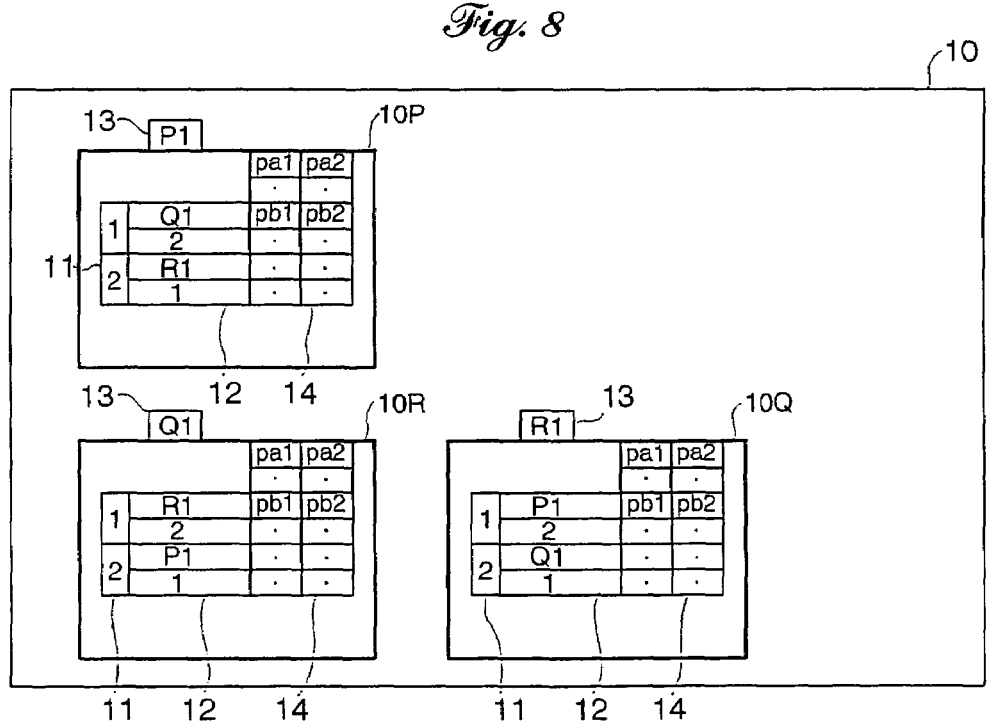
FIG. 8 is a conceptual illustration of a data structure for a graph representation of the two-dimensional solid object shown in FIG. 1 according to the other embodiment of the present invention which consists of topological and geometric information of individual constitutive points.

FIGS. 7 and 8 schematically illustrate data structures for a representation of topological and geometrical information of a two- or three-dimensional object in accordance to still another embodiment of the present invention. According to this embodiment, the data structure consists of point data of individual constitutive points that represent a circular-ordered adjacency list of each constitutive point as the topological information as described in the previous embodiments and attributes peculiar to each constitutive point as geometric information.

Referring to FIG. 7 illustrating schematically illustrating a conceptual configuration of the data structure for a representation of topological and geometric information of the graph 200, namely the tetrahedron PQRS, shown in FIG. 2, the data structure consists of a set of point data of the individual constitutive points P, Q R and R for a representation of topological information described in the form of a circular-ordered adjacency list of each constitutive point that has just the same as that of the previous embodiment and attributes including at least coordinate values of each constitutive point. The point data consists of circular-ordered adjacency lists 12 of the individual constitutive points P, Q, R and S written in respective storage areas 10P, 10Q, 10R and 10S of a storage medium allocated to the individual points P, Q, R and S by being assigned distinctive addresses P1, Q1, R1 and S1, respectively. The point data of each constitutive point P, Q, R or S contains various attributes associated with the constitutive point itself and a line segment by which the constitutive point is connected to its associated adjacent points. Specifically, as shown in FIG. 7, the point data of the constitutive point P contains attribute information denoted by a reference numeral 14 that includes attributes peculiar to the constitutive point P such as coordinate values pa1 and an attribute pa2 in association with, for example, a geometric connection with other graphs, and attributes associated with segment lines by which the constitutive point P is connected to its associated adjacent points Q, R and S (only attributes pb1 and pb2 of a line segment for connecting the constitutive point P to the adjacent point Q are shown). Much the same is true on the point data of the constitutive points Q, R and S.

FIG. 8 schematically illustrates a conceptual configuration of the data structure that is just the same in configuration as that described above, except that it represents topological and geometric information of the graph 100 shown in FIG. 1.

The geometric information includes attributes of constitutive point such as, for example, geometrical property of constitutive points, types or features of constitutive points, pictorial qualities or features of constitutive points and relationships of constitutive points relative to other graphs, and attributes of line segments between adjacency pairs of constitutive points such as, for example, geometrical or algebraic structures or features and pictorial features.

Examples of the attributes of constitutive point include absolute or relative coordinate values of constitutive point, types, sizes or shapes of constitutive point, colors of constitutive point, types of processing to be applied to a constitutive point, a geometrical correlativity of constitutive point with other graphs, types of algebraic curve or free curve that is drawn by the use of a constitutive point as a control point, and the like. These attributes of constitutive point may be written in the form of a real value, a coded value or a pointer to a storage location of the value in the storage areas associated with a given constitutive point. Examples of the curves include algebraic curves such as spline curves, B-spline curves, Bezier curves, non-uniform rational B-spline (NURBS) curves, subdivision curves and the like, and free curves other than these algebraic curves.

Examples of the attributes of line segment include a type or a thickness of line, colors of line, definition equations of curve, a domain of line segment to which a constant or a variable of the definition equation is applied, a types of curve, and the like. These line attributes may be written in the form of a code value or a pointer to a storage location of the code value in the storage areas associated with the given constitutive point. Examples of types of curve include algebraic curves such as spline curves, B-spline curves, Bezier curves, non-uniform rational B-spline (NURBS) curves, subdivision curves and the like, and free curves other than these algebraic curves. The point data may contain one or more attributes of each constitutive point and one or more attributes of each line segment.

It is practically preferred to specify the attributes of line in numerical code. Set out below is a coding scheme of typical attributes of line.

| Attribute Code | Definition of Line |
| --- | --- |
| 100 | Point on a surface |
| 110 | Point on a planar surface |
| 120 | Point on a circular arc |
| 120 | Point on a Bezier surface |
| . | |
| . | |
| . | |
| 200 | Control point on a curved surface |
| 210 | Control point of a Bezier surface |
| 220 | Control point of a NURBS surface |
| 230 | Control point of a quadric surface |
| . | |
| . | |
| . | |
| 300 | Point on a boundary |

-continued

| Attribute Code | Definition of Line |
| --- | --- |
| 310 | Point on a boundary between planar and Bezier surfaces |
| 320 | Point on a boundary between planar and B-spline surfaces |
| . | |
| . | |
| . | |
| 400 | Control Point |
| 410 | Control point of a quadrangular patch of Bezier surface |
| 420 | Control point of a triangular patch of Bezier surface |
| 430 | Control point of a pentangular patch of Bezier surface |
| . | |
| . | |
| . | |
| 1000 | Line |
| 1100 | Straight line segment that is swept horizontally to define a planar surface. |
| 1200 | Line segment defining a boundary between planar and Bezier surfaces |
| 1300 | Line segment defining a boundary between planar and B-spline surfaces |
| 1410 | Line segment defining a boundary between planar and subdivision surfaces (S curved-surface) |
| 1420 | Line segment defining a boundary between a planar surface and a subdivision surface (Catmull-Clark curved-surface) |
| 1500 | Line segment defining a boundary between planar and spline interpolated surfaces |
| 1600 | Line segment defining a boundary between planar and NURBS surfaces (a weighting factor is given separately) |
| 1700 | Line segment defining a boundary between planar and quadric surfaces (a condition is given separately) |
| 1800 | Control point of a quadrangular patch of B-spline surface |

For example, in FIGS. 7 and 8, if the attribute pb1 associated with the adjacent point Q described in the first storage location of the circular-ordered adjacency list 10P is given by a code number "110," the line segment drawn between the adjacent pair of constitutive points is a straight line segment.

The jobs to be performed are different according to the attributes. When using a 16-bit byte for attribute information, the byte can provide as much as 65,536 different types of attributes. Because, when describing the attribute information in terms of coded numbers or characters in this way, the point data has only to represent numerical values or characters, the data structure of the present invention can represent full details of adjacency and attributes of all individual constitutive points and attributes of line segments between adjacency pairs of constitutive points without quantitative expansion of point data. The data structure of the present invention enables unified data manipulation of two- and thee-dimensional graphs in the very same data format and, in consequence, facilitates handling of complex two- or three-dimensional object modeling which includes planar and curved constitutive surfaces.

The data structure in accordance with still another embodiment of the present invention represents alteration history information of a graph for two- or three-dimensional object modeling. Alterations of an objective graph includes, for example, displacement, deletion or addition of one or more constitutive points, changes of adjacencies of constitutive point, changes of attributes of constitutive point or line segment, and the like. The alteration history is a log of time-series alterations made until a latest objective graph. The data structure consists of point data of individual constitutive points which contain alteration information of constitutive point themselves. Therefore, the data structure excludes dependency of alteration history on commands and, in consequence, enables retrieval of data at any level of alteration from a file of the data structure according to the alteration history information. This is significantly contributory to two- or three-dimensional object modeling.

Figure 9A:
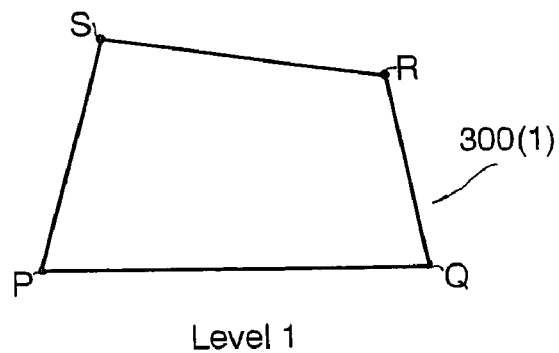
FIGS. 9A, 9B and 9C are graphic illustrations showing alteration levels of a graph.
Figure 9B:
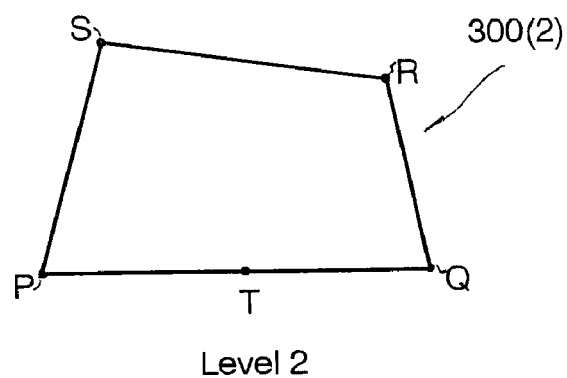
Figure 9C:
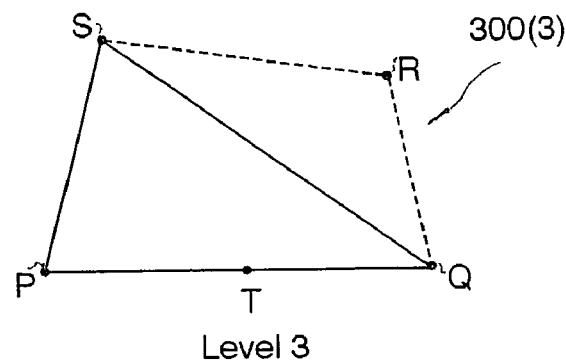

FIGS. 9A, 9B and 9C show an example of alteration process of a graph 3F of a graph representation of a polygonal or two-dimensional object. An original graph 300(1), namely a quadrangle PQRS, at a first alteration level (original level) 1 shown in FIG. 9A is altered by addition of a constitutive point T at an alteration level 2 as shown in FIG. 9B and then by deletion of the constitutive point R at an alteration level 3 as shown in FIG. 9C.

Figure 10A:
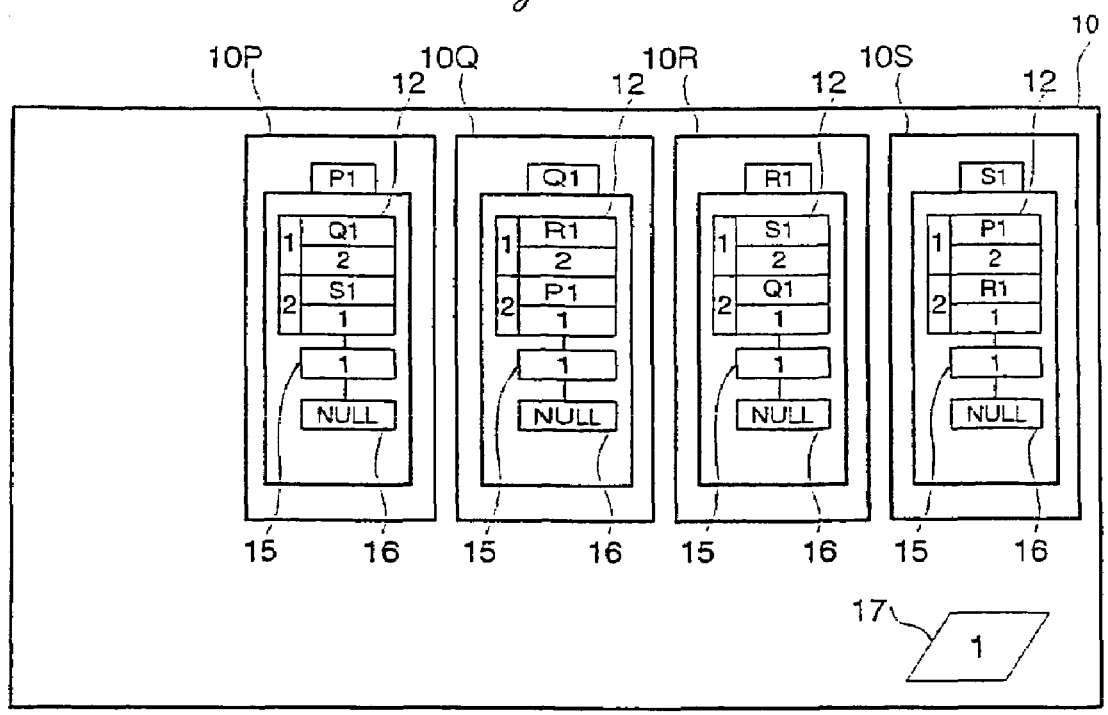
FIG. 10A is a conceptual illustration of a data structure for a representation of the graph shown in FIG. 9A according to a further embodiment of the present invention which is at a first level of alteration history.
Figure 10B:
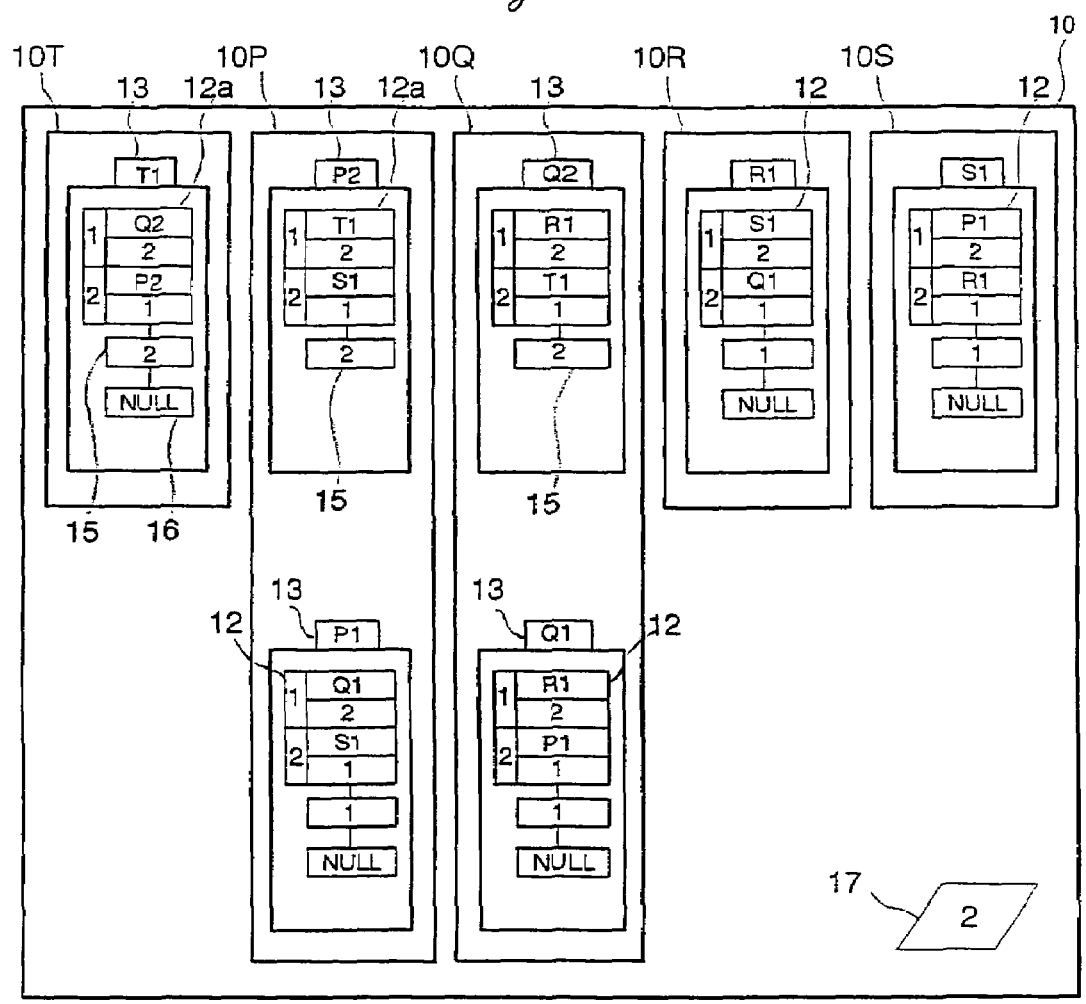
FIG. 10B is a conceptual illustration of the data structure for a representation of the graph shown in FIG. 9B which is at a second level of alteration history.
Figure 10C:
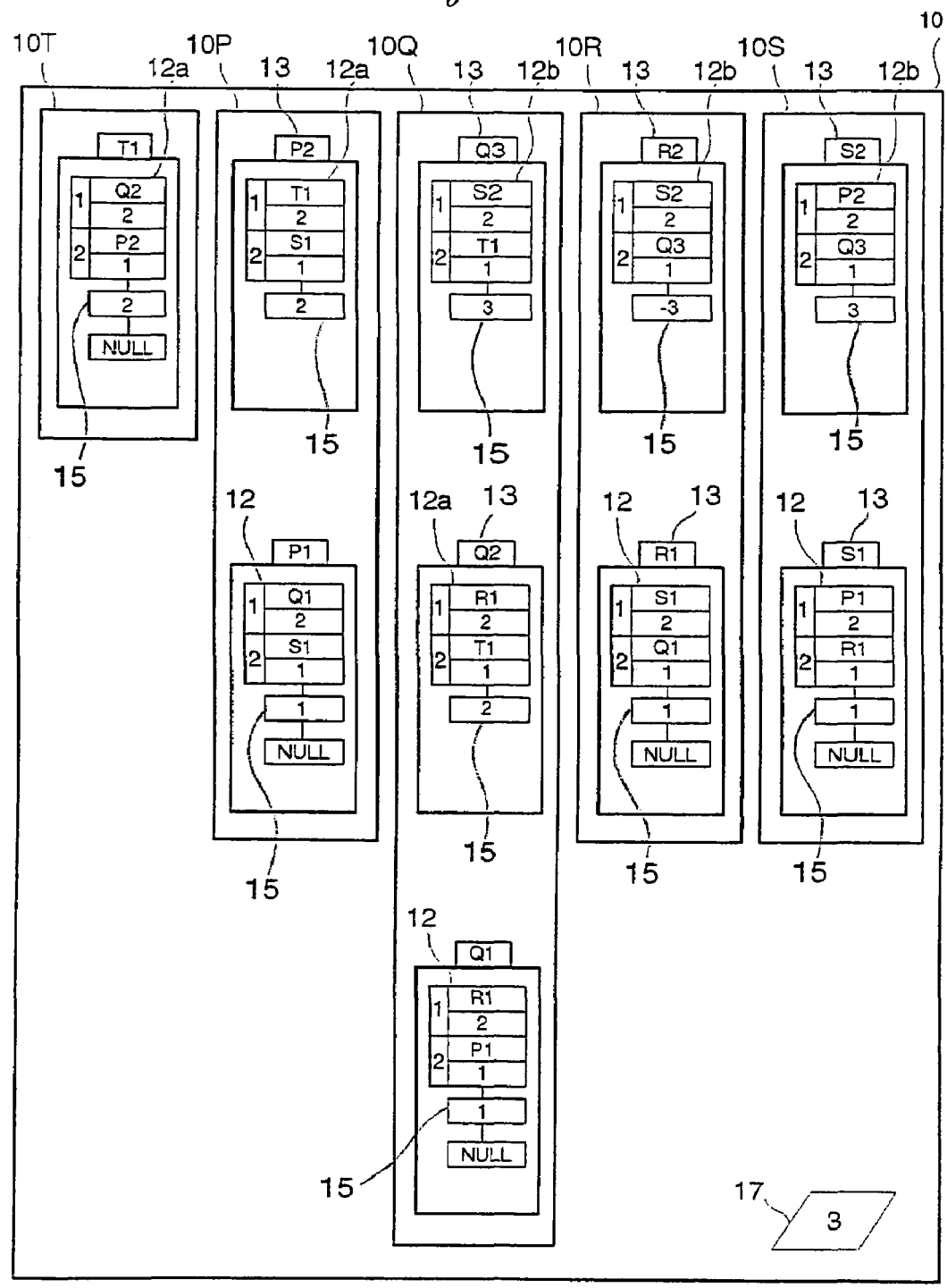
FIG. 10C is a conceptual illustration of the data structure for a representation of the graph shown in FIG. 9C which is at a third level of alteration history.

FIGS. 10A, 10B and 10C schematically illustrates conceptual configurations of the data structure for representations of these altered graphs shown in FIGS. 9A, 9B and 9C, respectively. As shown in FIG. 10A, the data structure for a representation of the original graph 300(1) at an original or first alteration level (level 1) shown in FIG. 9A consists of a set of point data of the individual constitutive points. This data structure is assigned an alteration level value (which is hereinafter referred to a data structure alteration level value) of "1," this indicates the data structure is originally provided. The point data of each constitutive point is basically the same as those described in the previous embodiments, except that it contains information on an alteration history level. Specifically, the data structure of this embodiment consists of point data of the individual constitutive points for representing circular-ordered adjacency lists 12 of the individual constitutive points P, Q, R and S written in the storage areas 10P, 10Q, 10R and 10S, respectively. The circular ordered adjacency list 12 is accompanying by information indicating an alteration history level as denoted by a reference numeral 15, which is the same as the data structure alteration level value of "1" as denoted in a storage location 17. The point data originally obtained is always accompanied by a null code "NULL" as denoted by a reference numeral 16.

When altering the original graph 300(1) shown in FIG. 9A to a graph 300(2) as shown in FIG. 9B by adding a constitutive point T on a line segment between constitutive points P and Q the adjacency of the constitutive point P and Q are incidentally altered. Specifically, the constitutive point P changes its adjacency from the constitutive point Q to the constitutive point T. Simultaneously, the constitutive point Q changes its adjacency from the constitutive point P to the constitutive point T.

FIG. 10B shows the data structure for a representation of an altered graph 300(2). This data structure is assigned a data structure alteration level value of "2" in the storage location 17. The data structure alteration level value of "2" indicates that alteration has been made once in the original graph. In the data structure, point data of the constitutive points T, P and Q are added and the original point data are left as they are. The point data of the constitutive point T is basically the same as those described above, that is, it represents a circular-ordered adjacency lists 12 in a storage area 10T reserved by being assigned a distinctive address T1. The circular ordered adjacency list 12 is accompanying by an value of "2" indicated by a reference numeral 15 that is the same as that of the data structure written in the storage location 17 and a null code "NULL" as denoted by-a reference numeral 16. The point data of the constitutive point P after the alteration is additionally created to represent a circular-ordered adjacency lists 12 describing a new adjacency relationship in an unoccupied area of the storage area 10P reserved by being assigned a distinctive address P2. An address pointer P2 appears in the second storage location 2 of the circular ordered adjacency list 12 of the constitutive point T. In the circular ordered adjacency list 12 of the consecutive point P the address pointer in the first storage location 1 is changed from the address pointer R1 to the address pointer T1 due to the addition of the constitutive point T. Further, the circular ordered adjacency list 12 is accompanied by an alteration level value of "2." Similarly, The point data of the constitutive point Q after the alteration is additionally created to represent a circular-ordered adjacency lists 12 describing a new adjacency relationship in an unoccupied area of the storage area 10Q reserved by being assigned a distinctive address Q2. An address pointer Q2 appears in the first storage location 2 of the circular ordered adjacency list 12 of the constitutive point T. In the circular ordered adjacency list 12 of the constitutive point Q the address pointer in the second storage location 2 is changed from the address pointer P1 to the address pointer T1 due to the addition of. the constitutive point T. Further, the circular ordered adjacency list 12 is accompanied by an alteration level value of "2."

When further altering the graph 300(2) shown in FIG. 9B to a graph 300(3) as shown in FIG. 9C by deleting the constitutive point R between constitutive points Q and S, the adjacency of the constitutive point Q and S are incidentally altered. Specifically, the constitutive point Q changes its adjacency from the constitutive point R to the constitutive point S. Simultaneously, the constitutive point S changes its adjacency from the constitutive point R to the constitutive point Q.

FIG. 10C shows the data structure for a representation of an altered graph 300(3). This data structure is assigned a data structure alteration level value of "3" in the storage location 17. The data structure alteration level value of "3" indicates that alteration has been made twice in the original graph. In the data structure, point data of the constitutive points P, Q and S are added and the point data originally obtained and added at the second alteration level are left as they are. Point data of the constitutive point R is additionally created the same circular-ordered adjacency lists 12 as originally obtained but accompanied in an unoccupied area of the storage area 10R reserved by being assigned a distinctive address R2 but accompanied by an alteration level value of "3" with a minus sign (−) indicating an end label. Point data of the constitutive point Q after the alteration is additionally created to represent a circular-ordered adjacency lists 12 describing a new adjacency relationship in an unoccupied area of the storage area 10Q reserved by being assigned a distinctive address Q3. In the circular ordered adjacency list 12 of the constitutive point Q the address pointer in the first storage location 2 is changed from the address pointer R1 to the address pointer S1 due to the deletion of the constitutive point R. Further, the circular ordered adjacency lists 12 is accompanied by an alteration level value of "3." Further, point data of the constitutive point S after the alteration is additionally created to represent a circular-ordered adjacency lists 12 describing a new adjacency relationship in an unoccupied area of the storage area 10S reserved by being assigned a distinctive address S2. In the circular ordered adjacency list 12 of the constitutive point S the address pointer in the second storage location 2 is changed from the address pointer R1 to the address pointer Q1 due to the deletion of the constitutive point R. Further, the circular ordered adjacency list 12 is accompanied by an alteration level value of "3."

The alteration level value of the data structure is changed by one increment every time some kind of alteration is made. Therefore, the data structure of this embodiment enables retrieval of any past graph by designating a desired alteration level. For example, the data structure indicating a current alteration level value of "40," this indicates that alteration have been made 39 times until now. When it is requested to retrieve a graph five alteration levels before, namely a graph at a data structure alteration level of 24, the requested graph is easily retrieved by collecting point data having an alteration level value of "25" or a highest alteration level value less than "25." In this manner, it is realized to retrieve any past graph on demand without introducing confusion on the point data even though a large number of alterations have been made.

Hereinafter, a description is directed to a process of producing the data structure described above which will be best understood by reviewing FIGS. 11-21 showing various flow charts illustrating various routines for a microcomputer. Programming a computer is a skill well understood in the art. The following description is written to enable a programmer having ordinary skill in the art to prepare an appropriate program for the microcomputer. The particular details of any such program would of course depend upon the architecture of the particular computer selected.

Figure 11:
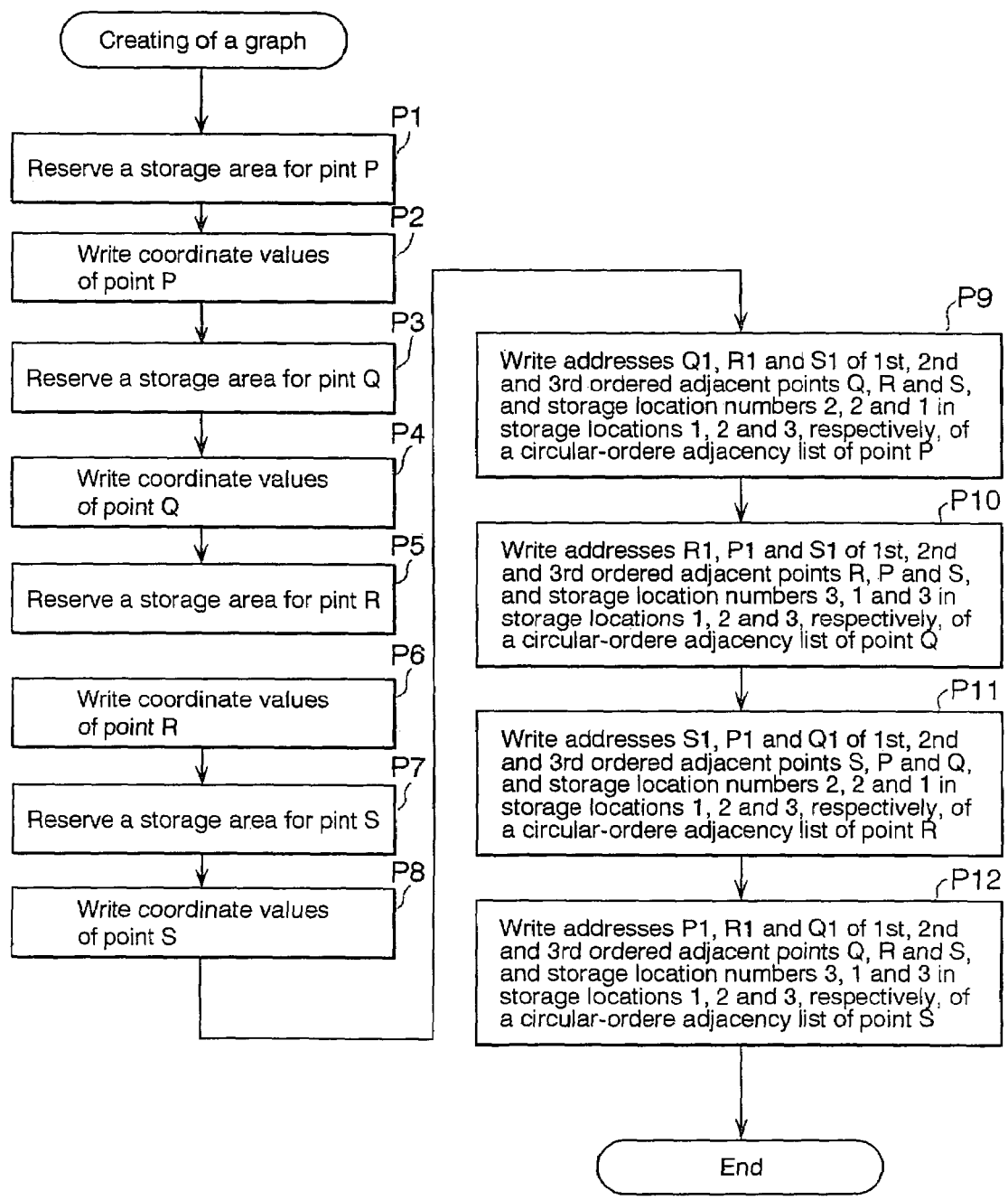
FIG. 11 is a flow chart illustrating a process of creating the data structure of the present invention.

FIG. 11 is a flow chart illustrating a process of producing a data structure as shown in FIG. 6 for a representation of topological and graphical information of a graph 200 shown in FIG. 3. First of all, a storage area 10P having sufficient storage capacity is reserved on a storage medium 10 such as RAM by assigning a distinctive address P1 to the constitutive point P in step P1. Then, a number of adjacent points, namely 3 in this case, and coordinate values of the constitutive point P are entered. As a result of the entry, while the coordinate values are written, three storage locations 1, 2 and 3 are reserved for writing addresses of the adjacent points. In the same manner, a storage area 10Q having sufficient storage capacity is reserved by assigning a distinctive address Q1 to the constitutive point Q in step P3, and, then, coordinate values of the constitutive point Q are written in the storage area 10Q in step P4. The same procedures are executed in steps P5 through P8 for writing coordinate values of the constitutive points R and S in associated storage areas 10R and 10S, respectively, in steps P5 through P8. The storage areas 10P, 10Q, 10R and 10S may or may not be sequenced.

Figure 12:
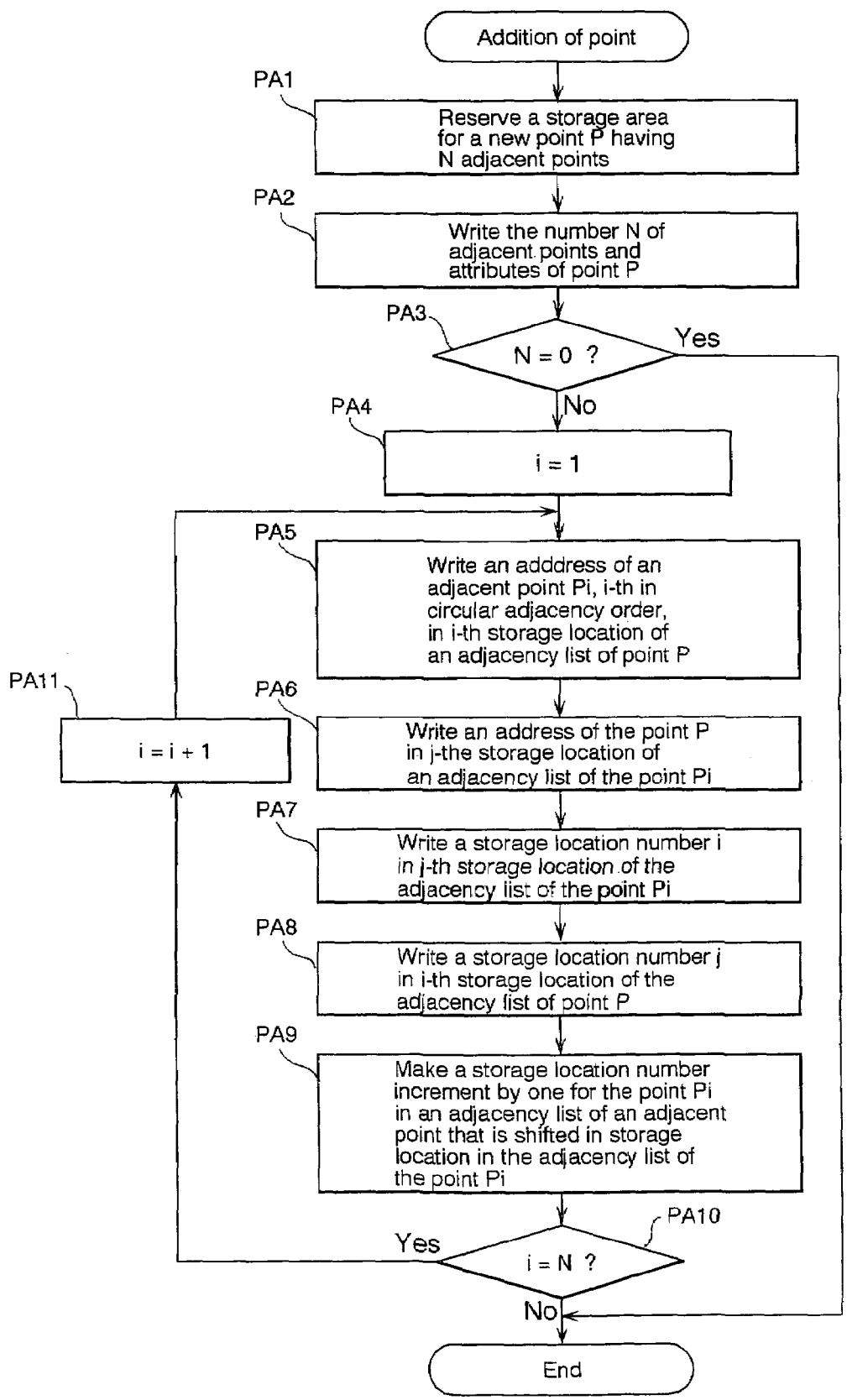
FIG. 12 is a flow chart illustrating a process of creating or adding a constitutive point.

Subsequently, in step P9, the address pointers Q1, R1 and S1 are written in fix second and third storage locations 1, 2 and 3, respectively, of the storage area 10P in the counterclockwise circular adjacency order. Simultaneously, storage location numbers 2, 2 and 1 indicating storage locations 2, 2 and 1 of the storage areas 10Q, 10R and 10S, respectively, where the address pointer P1 is written in are written in association with the address pointers Q1, R1 and S1, respectively. Similarly, in step P10, the address pointers R1, P1 and S1 are written in first, second and third storage locations 1, 2 and 3, respectively, of the storage area 10Q in the counterclockwise circular adjacency order, and, simultaneously, storage location numbers 3, 1 and 3 indicating storage locations 3, 1 and 3 of the storage areas 10Q, 10R and 10S, respectively, where the address pointer Q1 is written in are written in association with the address pointers R1, P1 and S1, respectively. In step P11, the address pointers S1, P1 and Q1 are written in first, second and third storage locations 1, 2 and 3, respectively, of the storage area 10R in the counterclockwise circular adjacency order, and, simultaneously, storage location numbers 2, 2 and 1 indicating storage locations 2, 2 and 1 of the storage areas 10S, 10P and 10Q, respectively, where the address pointer R1 is written in are written in association with the address pointers S1, P1 and Q1, respectively. In step P12, the address pointers P1, R1 and Q1 are written in first, second and third storage locations 1, 2 and 3, respectively, of the storage area 10S in the counterclockwise circular adjacency order, and, simultaneously, storage location numbers 3, 1 and 3 indicating storage locations 3, 1 and 3 of the storage areas 10P, 10R and 10Q, respectively, where the address pointer S1 is written in are written in association with the address pointers P1, PR and Q1, respectively. In this instance, the circular ordered adjacency list describes adjacency points in circular order, FIG. 12 is a flow chart illustrating a process of adding a constitutive point P having N adjacent points around the constitutive point P. In the same manner as described above, a storage area for the constitutive point P is reserved in the storage medium by assigning a distinctive address to the constitutive pint P in step PA1. Then, the number N of adjacent points and an attribute, such as coordinate values of the constitutive point P are entered in step PA2. As a result, the coordinate values are written in the storage area, and simultaneously three storage locations are reserved. Subsequently a decision is made in step PA3 as to whether the number of adjacent points N is 0 (zero) or not. If the answer to the decision is affirmative, the process is terminated. If the answer to the decision is negative, after setting an ordinal number of constitutive point i to 1 (one) in step PA4, an address of an i-th adjacent point Pi as viewed in the counterclockwise direction is written as an address pointer in an i-th storage location of a circular ordered adjacency list in step PA5. Further, the address pointer of the constitutive point P is written in j-th storage location of a circular ordered adjacency list of the adjacent point Pi in step PA6. Subsequently, a storage location number i is written in the storage location j of the circular ordered adjacency list of the adjacent point Pi in step PA7, and a storage location number j is written in the storage location i of the circular ordered adjacency list of the constitutive point Pi in step PA8. Thereafter, the storage location number accompanying the address pointer of the adjacent point Pi written in a circular ordered adjacency list of an adjacent point that is shifted in storage location in the adjacency list of the adjacent point Pi due to the addition of the constitutive point P is changed by one increment in step PA9. Finally, a decision is made in step PA10 as to whether the ordinal number i is coincident with N or not. If the answer to the decision is affirmative, then, the process is terminated. On the other hand, if the answer is negative, then, after changing the ordinal number i by one increment in step PA11, steps PA5 through PA10 are repeated until the ordinal number i becomes incident with N.

Figure 13:
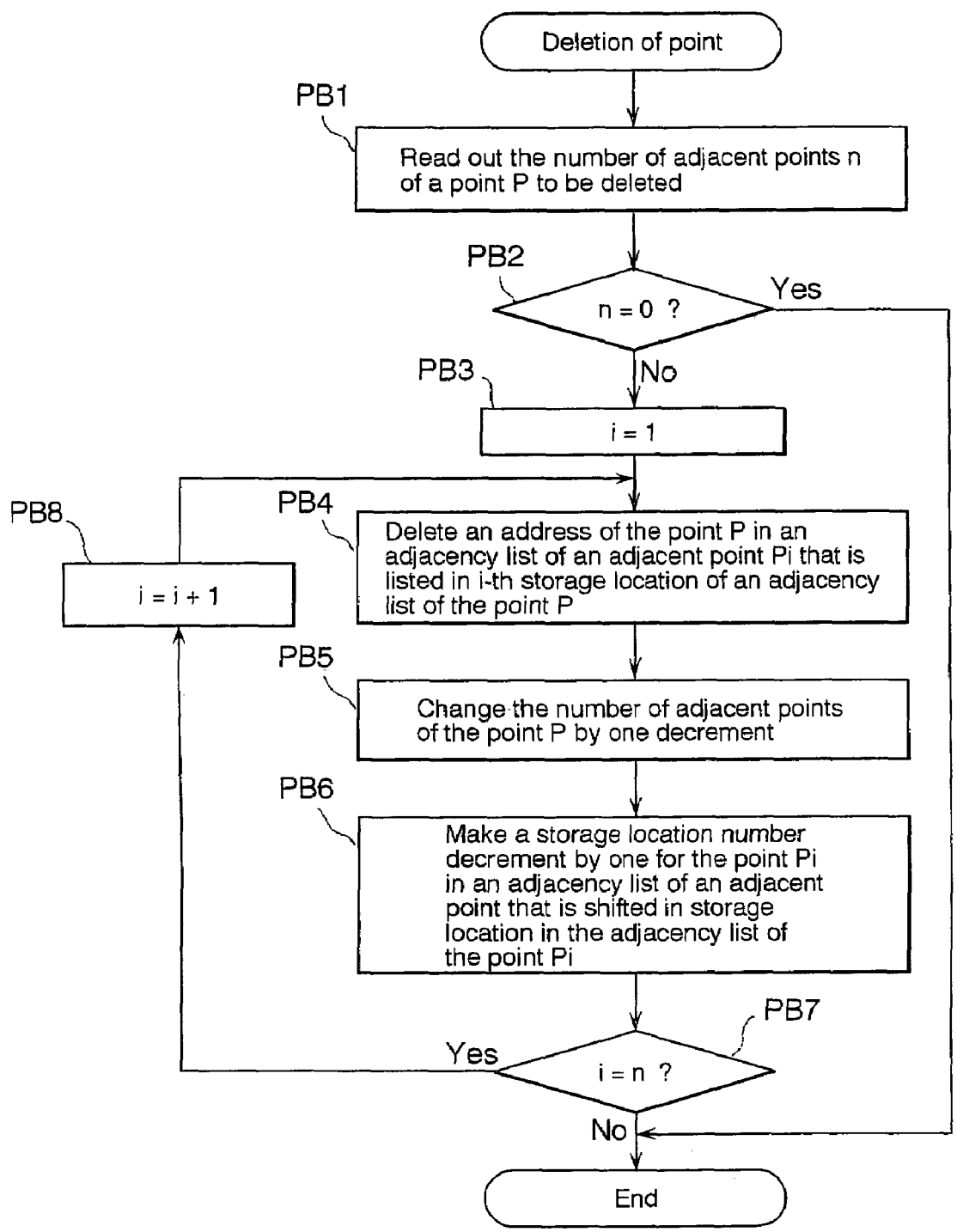
FIG. 13 is a flow chart illustrating a process of deleting a constitutive point.

FIG. 13 is a flow chart illustrating a process of deleting a constitutive point P having n adjacent points around the constitutive point P. After reading the number of adjacent points n in step PB1, a decision is made in step PB2 as to whether the number of adjacent points n is 0 (zero) or not. When the answer is affirmative, after releasing the storage area for the constitutive point P in step PB7, the process is terminated. On the other hand, if the answer is negative, then, after setting the ordinal number i to 1 (one) in step PB3, the address of the constitutive point P written as an address pointer in the circular ordered adjacency list of an adjacent point Pi whose address is written as an address pointer in i-th storage location of the circular ordered adjacency list of the constitutive point P is erased in step PB4. Subsequently, changing the number of adjacent point n associated with the constitutive point Pi by one decrement in step PB5, the storage location number accompanying the address of the adjacent point Pi written as an address pointer in a circular ordered adjacency list of an adjacent point that is shifted in storage location in the adjacency list of the adjacent point Pi due to the addition of the constitutive point P is changed by one decrement in step PB6. Finally, a decision is made in step PB7 as to whether the ordinal number i is coincident with N or not. If the answer to the decision is affirmative, then, after releasing the storage area for the constitutive point P in step PB7, the process is terminated. On the other hand, if the answer is negative, then, after changing the ordinal number i by one decrement in step PB8, steps PB4 through PB7 are repeated until the ordinal number i becomes incident with N.

Figure 14:
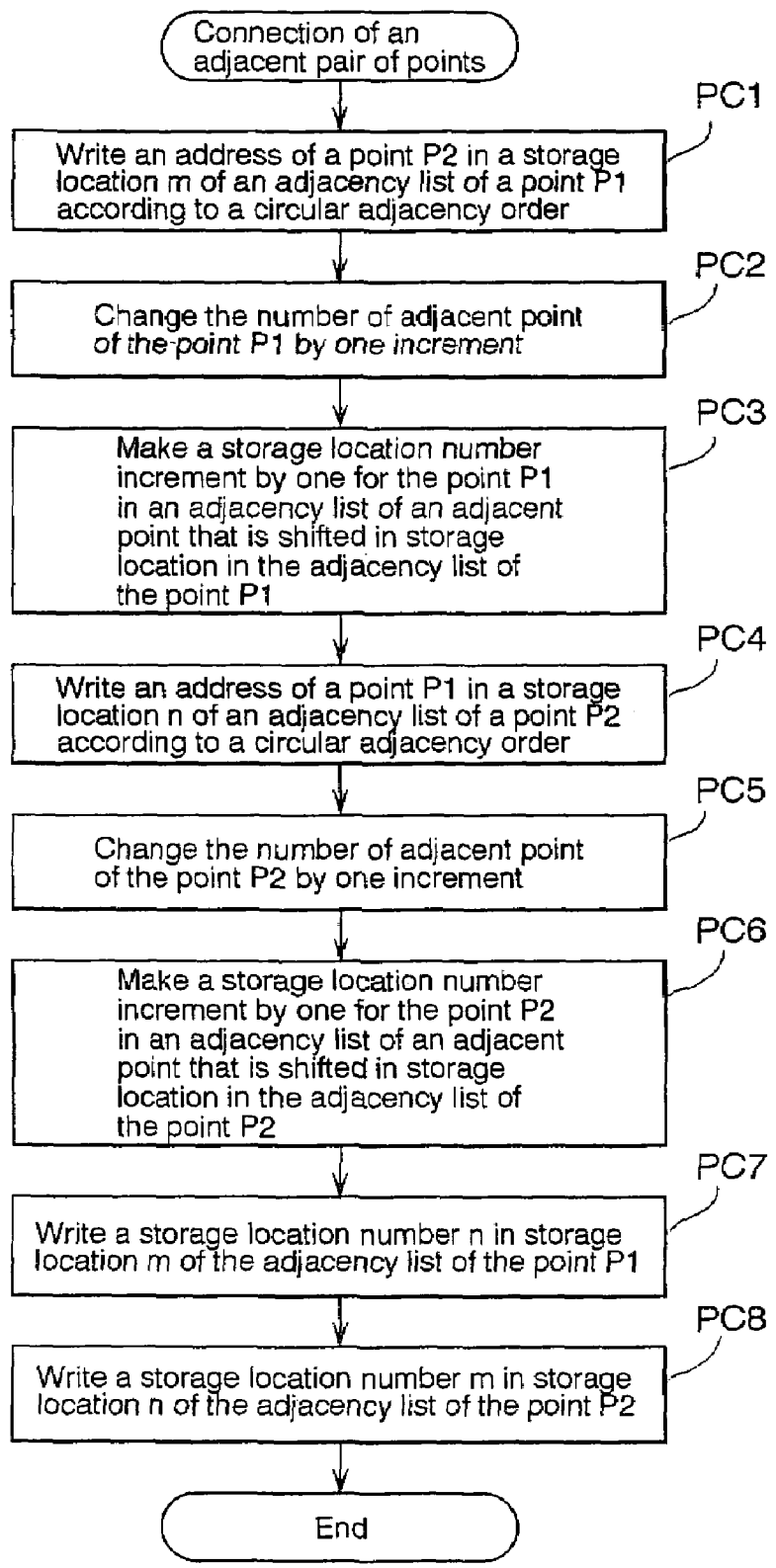
FIG. 14 is a flow chart illustrating a process of connecting an adjacent pair of constitutive poins with a line segment.

FIG. 14 is a flow chart illustrating a process of connecting constitutive point P1 and P2. The address of the constitutive point P2 is written as an address pointer in an m-th storage location of the circular ordered adjacency list of the constitutive point P1 in the counterclockwise direction in step PC1. After changing the number of adjacent points associated with the constitutive point P1 by one increment in step PC2, the storage location number accompanying the address of the adjacent point P1 written as an address pointer in a circular ordered adjacency list of an adjacent point that is shifted in storage location in the adjacency list of the adjacent point P1 due to an addition of constitutive point is changed by one increment in step PC3. Subsequently, the same operation as through steps PC1 to PC3 is repeated with respect to the constitutive point P2 through steps PC4 to PC6. That is, the address of the constitutive point P2 is written as an address pointer in an n-th storage location of the circular ordered adjacency list of the constitutive point P2 in the counterclockwise direction in step PC4. After changing the number of adjacent points associated with the constitutive point P2 by one increment in step PC5, the storage location number accompanying the address of the adjacent point P2 written as an address pointer in a circular ordered adjacency list of an adjacent point that is shifted in storage location in the adjacency list of the adjacent point P2 due to an addition of constitutive point is changed by one increment in step PC6. Subsequently storage location numbers n and m are written in the m-th storage location of the circular ordered adjacency list of the constitutive point P1 and the m-th storage location of the circular ordered adjacency list of the constitutive point P1, respectively, in steps PC7 and PC8, respectively. In this manner, the constitutive points P1 and P2 are connected to establish an adjacency relationship therebetween.

Figure 15:
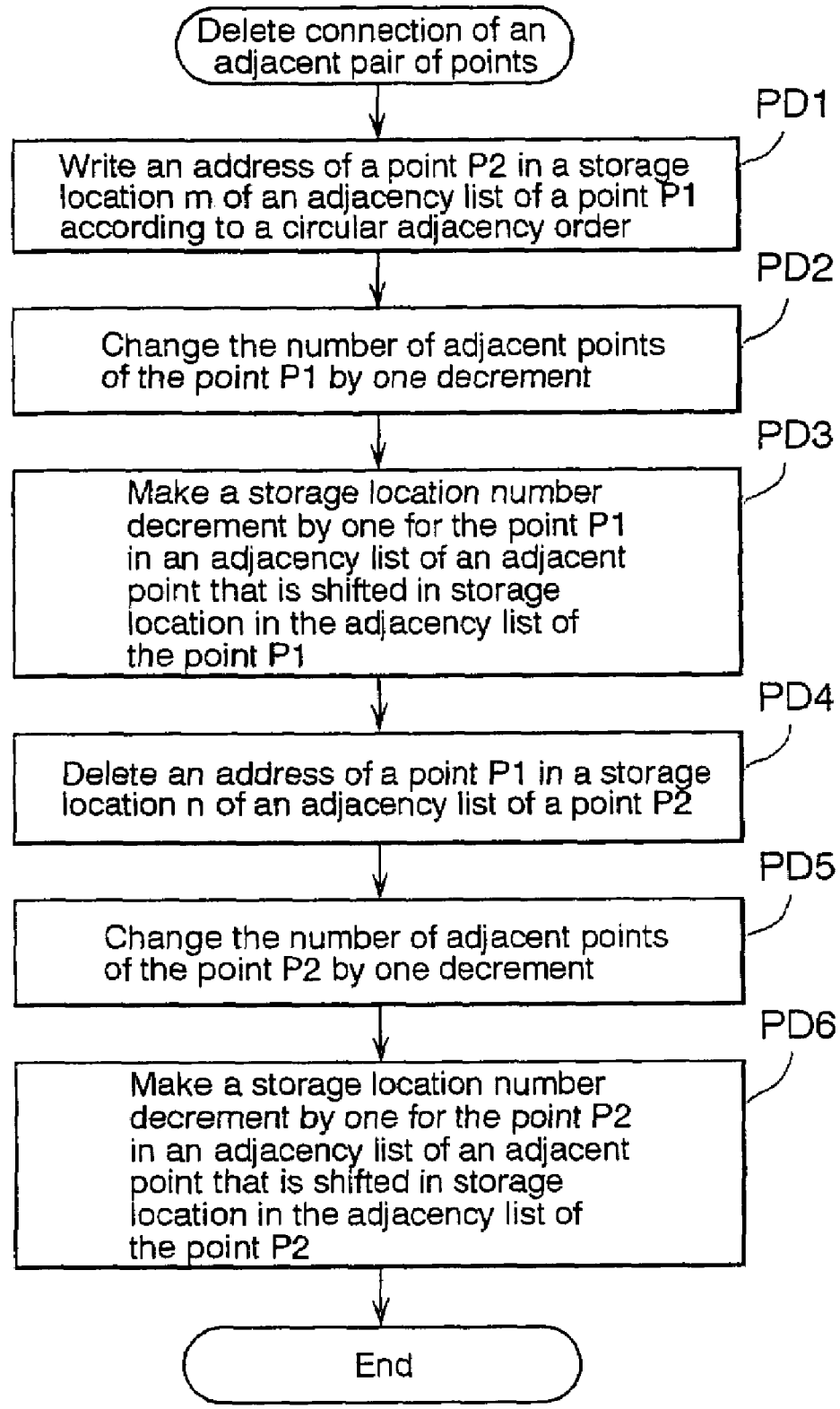
FIG. 15 is a flow chart illustrating a process of deleting an adjacent point of a given constitutive point.

FIG. 15 is a flow chart illustrating a process of deleting connection between constitutive point P1 and P2. For a start, the address of the constitutive point P2 written as an address pointer in the circular ordered adjacency list of the constitutive point P1 is erased in step PD1. After changing the number of adjacent points associated with the constitutive point P1 by one increment in step PD2, the storage location number accompanying the address of the adjacent point P1 written as an address pointer in a circular ordered adjacency list of an adjacent point that is shifted in storage location in the adjacency list of the adjacent point P1 due to an addition of constitutive point is changed by one decrement in step PD3. After performing the same operation as through steps PD1 to PD3 with respect to the constitutive point P2 through steps PD4 to PD6, the process is terminated. In this manner, the constitutive points P1 and P2 are disconnected, and hence, lose the adjacency relationship therebetween.

FIG. 16 is a flow chart illustrating a process of extracting a constitutive point K-th from a constitutive point P1 in a counterclockwise direction based on the constitutive point P1 and a constitutive point P2 adjacent to the constitutive point P1. That is, a storage location number m assigned to an address of the constitutive point P2 as an address pointer in a counterclockwise circular ordered adjacency list of the constitutive point P is read out in step PE1. The number of adjacent points n around the constitutive point P2 is read out in step PE2. Thereafter, an address written in a [{(m+n−K)mod n}+1]-th storage location of a counterclockwise circular ordered adjacency list of the constitutive point P2 is read out. The same operation is repeated until the address of the constitutive point P1 is found.

FIG. 17 is a flow chart illustrating a process of extracting a constitutive point K-th from a constitutive point P1 in a clockwise direction based on the constitutive point P1 and a constitutive point P2 adjacent to the constitutive point P1. The process is just the same as the process of extracting a constitutive point K-th from a constitutive point P1 in a counterclockwise direction, except that an address to be read out in step PF3 is one written in a [{(m+n−K)mod n}+1]-th storage location of a counterclockwise circular ordered adjacency list of the constitutive point P2.

Figure 18:
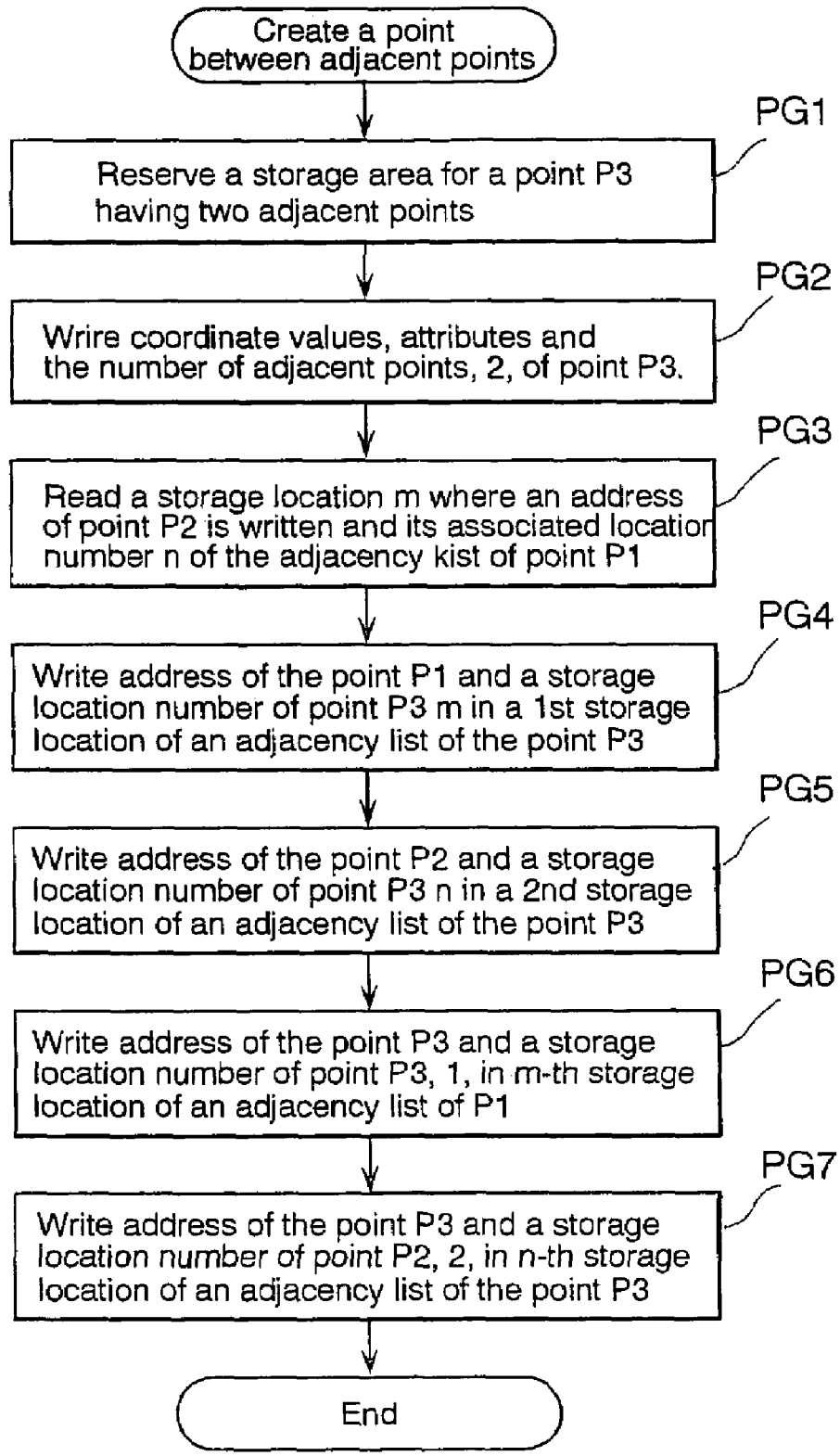
FIG. 18 is a flow chart illustrating a process of creating an constitutive point between a given constitutive point and one of adjacent points of the given constitutive point.

FIG. 18 is a flow chart illustrating a process of creating or adding a constitutive point P3 having two adjacent points between an adjacent pair of constitutive points P1 and P2. First of all, an unoccupied storage area having sufficient storage capacity is reserved on a storage medium 10 by assigning a distinctive address to the constitutive point P3 in step PG1. Then, coordinate values, and attributes if necessary, of the constitutive point and the number of adjacent points (two in this example) are written in step PG2. Subsequently, a storage location m of a circular ordered adjacency list of the constitutive point P1 in which an address of the constitutive point P2 is written as an address pointer and a storage location number m accompanying the address pointer are read out in step PG3. The address of the constitutive point P1 as an address pointer and a storage location number m are written in a first storage location of the circular ordered adjacency list of the constitutive point P3 in step PG4, and the address of the constitutive point P2 as an address pointer and a storage location number n are written in a second storage location of the circular ordered adjacency list of the constitutive point P3 in step PG5. Subsequently, the address of the constitutive point P3 as an address pointer and a storage location number 1 (one) are written in an m-th storage location of the circular ordered adjacency list of the constitutive point P1 in step PG6. Finally, the address of the constitutive point P3 as an address pointer and a storage location number 2 are written in an n-th storage location of the circular ordered adjacency list of the constitutive point P2 in step PG7. The, the process is terminated.

Figure 19:
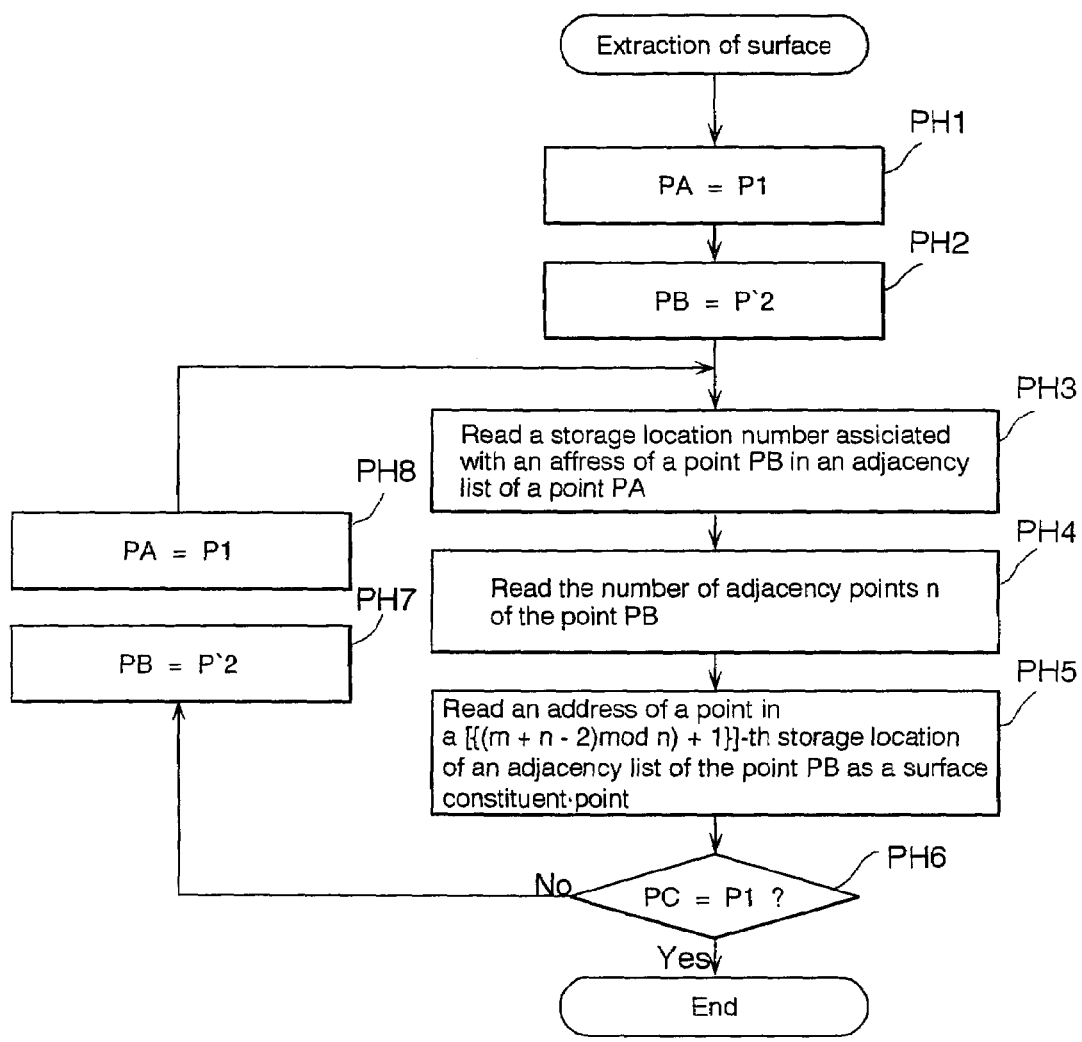
FIG. 19 is a flow chart illustrating a process of extraction of constitutive points for defining one surface of a three-dimensional solid object in a counterclockwise direction.

FIG. 19 is a flow chart illustrating a process of extraction of a surface of a graph representation of a polyhedral object on a left side of a boundary defined by a line segment between constitutive points P1 and P2 in a counterclockwise direction. At first, constitutive points P1 and P2 are designated as points PA and PB in steps PH1 and PH2, respectively. A storage location number m accompanying an address of the constitutive point PB as an address pointer written in a counter clockwise adjacency list of the constitutive point PA is read out in step PH3. After reading out the number of adjacent points n associated with the constitutive point PB in step PH4, a constitutive point whose address is written in [{(m+n−2)mod n}+1]-th storage location of a circular ordered adjacency list is read out as a constitutive point PC defining a surface to be extracted, in step PH5. Then, a decision is made in step PH6 as to whether the constitutive point PC is identical with the constitutive point P1. If the answer is affirmative, then, the process is terminated. On the other hand, if the answer is negative, then after designating the constitutive points PB and PC as constitutive points PA and PB, the steps PH3 through PH5 are repeated until the extracted constitutive point PC becomes coincident with the constitutive point P1.

Figure 20:
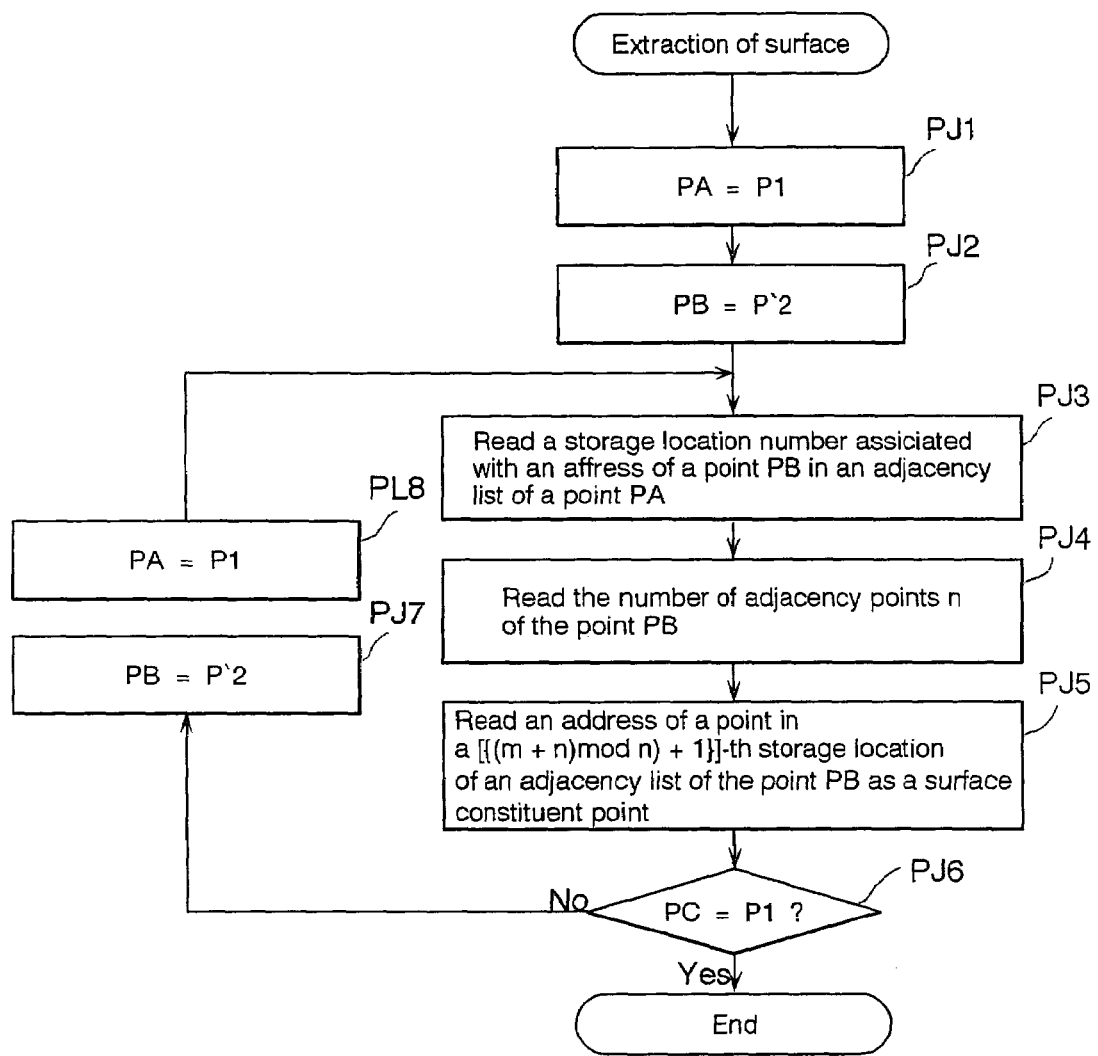
FIG. 20 is a flow chart illustrating a process of extraction of constitutive points for defining one surface of a three-dimensional solid object in a clockwise direction.

FIG. 20 is a flow chart illustrating a process of extraction of a surface of a graph representation of a polyhedral object on a left side of a boundary defined by a line segment between constitutive points P1 and P2 in a clockwise direction. The process is just the same as the process of extracting a surface of a graph representation of a polyhedral object in a counterclockwise direction, except that an address to be read out in step PJ3 is one written in a [{(m+n)mod n}+1]-th storage location of a counterclockwise circular ordered adjacency list of the constitutive point PB.

Figure 21:
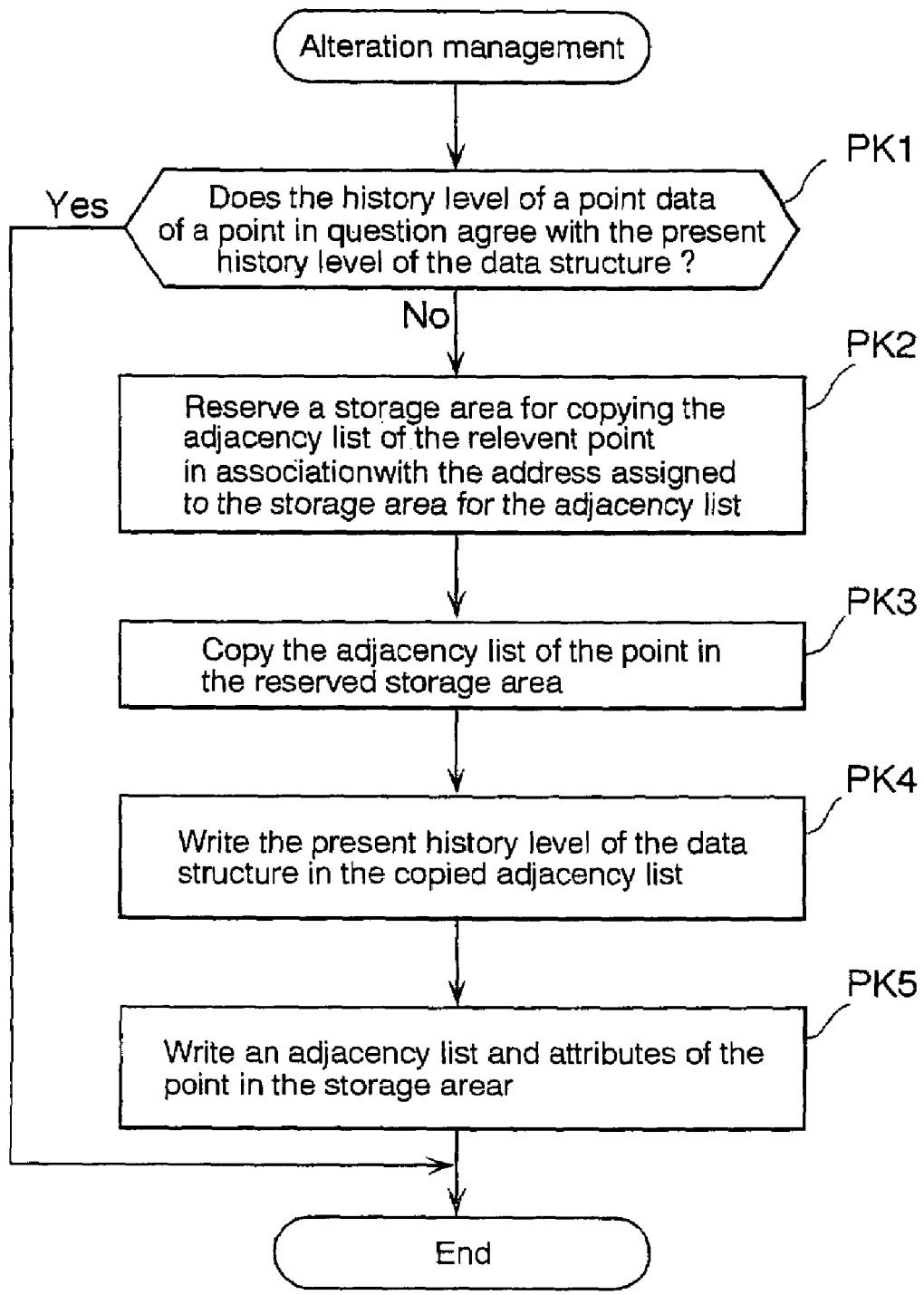
FIG. 21 is a flow chart illustrating a process of writing alteration history information in a data structure.

FIG. 21 a flow chart illustrating a process of alteration management, more specifically of point data writing for alteration of a constitutive point P. When an alteration applied to the constitutive point P coincides in alteration level with a current data base alteration level in step PK1, then, after writing altered point data of the constitutive point P in the storage area if they are altered in step PK6, the process is terminated. On the other hand, when an alteration level of the constitutive point P does not coincide with the current data base alteration level in step PK1, then, after reserving an occupied storage area in the storage area in step PK2, previous point data of the constitutive point P is copied in the additional storage area in step PK3. Subsequently, after writing a alteration level coincident with the current alteration level of the data structure in step PK4, a new address in association with is assigned to the additional storage area in step PK5. Finally altered point data of the constitutive point P are written in the additional storage area in step PK6.

Figure 22:
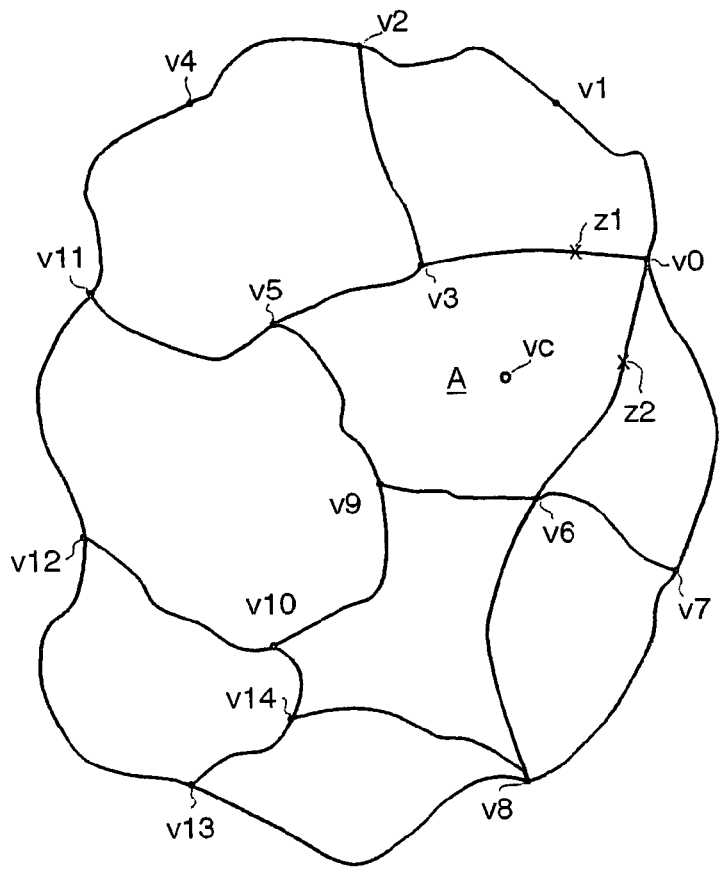
FIG. 22 is a geographic area map represented by the data structure according to an embodiment of the present invention.
Figure 23:
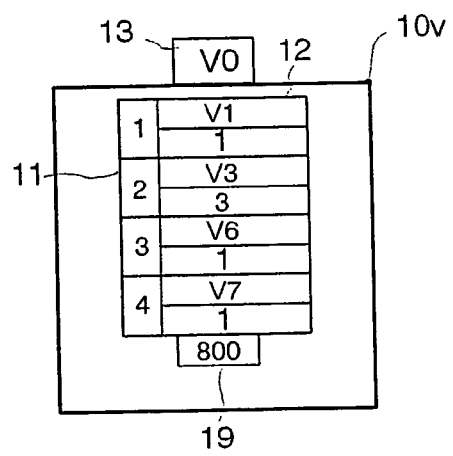
FIG. 23 is a conceptual illustration of a data structure for a representation of one of constitutive point of the geometric area map shown in FIG. 22.

The following description will be directed to an example of extracting graphic information of any partition or an area of a polygonal or two-dimensional object from the data structure of the present invention with reference to FIGS. 22 and 23.

Figure 24:
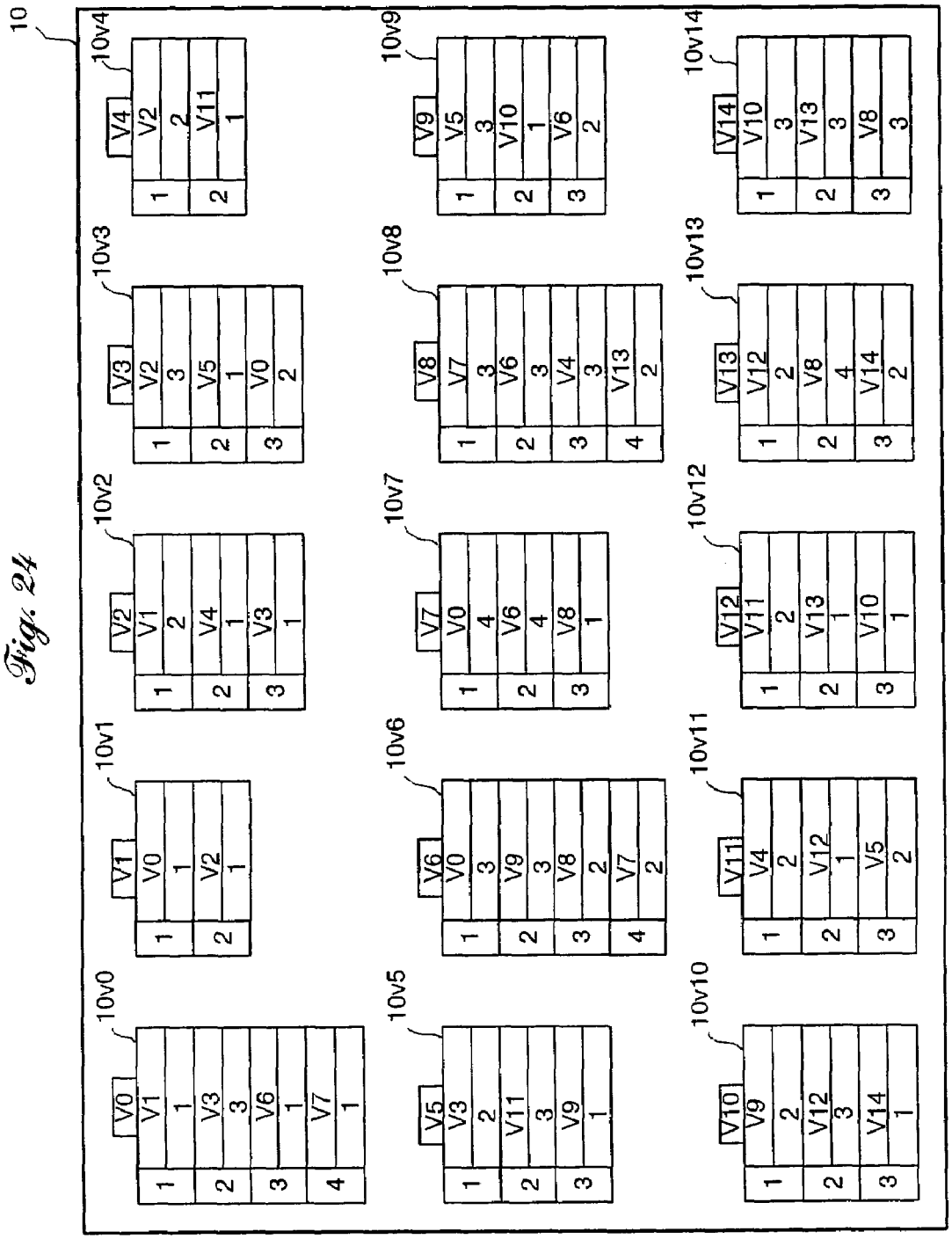
FIG. 24 is a conceptual illustration of the data structure for a graph representation of the geometric area map shown in FIG. 22 which consists of topological or adjacency information including storage location information.

FIG. 22 shows a geographic area map having constitutive points v0 to v14. The data structure for a representation of the geographic area map consists of a set of point data of the individual constitutive points v0 to v14. As shown in FIG. 23, the point data of, for example, the constitutive point v0 represents a circular-ordered adjacency list that describes addresses V1, V3, V6 and V7 of adjacent points v1, v3, v6 and v7 around the constitutive point v0 in order of counterclockwise direction as viewed from outside the geographic area map. These addresses V1, V3, V6 and V7 are written in sequenced storage locations 1, 2, 3 and 4 of the storage area allocated to the point data of the constitutive point v0. The addresses of the adjacent points v1, v3, v6 and v7 are accompanied by storage locations 1, 3, 1 and 1 respectively. That is, the address V0 of the constitutive point v0 is written in a first storage location 1 of a storage area allocated to the point data for the constitutive point v1, in a third storage location 3 of a storage area allocated to the point data for the constitutive point v3, in a fast storage location 1 of a storage area allocated to the point data for the constitutive point v6 and in a first storage location 3 of a storage area allocated to the point data for the constitutive point v7. The data structure for a representation of point data of the geographic area map having the constitutive points v0 to v14 is created in this manner as shown in FIG. 24 and stored as a data file.

When extracting a partition A defined by the constitutive points v0, v3, v5, v9 and v6, it is suffice to specify any two of the constitutive points that are directly adjacent to each other. For example, when specifying the constitutive point v3 as a starting point and the constitutive point v5 adjacent to the starting constitutive point v3 in the counterclockwise direction, the data for a representation of the partition A is extracted in the following way. At first, the circular-ordered adjacency list of the constitutive point v3 is referred to. It is found that the address V5 of the adjacent point v5 is accompanied by a storage location number 1. Then, in order to find a constitutive point adjacent to the constitutive point v5, a reference storage location is determined by subtracting 1 (one) from the storage location number 1. The result is 0 (zero). In point data extraction in counterclockwise direction, the reference storage location number 0 indicates just before the storage location 1, namely the storage location 3. This means that the adjacent point in question is indicated by an address in the third storage location 3 of the circular-ordered adjacency list of the constitutive point v5. That is, it is found that an address placed in the storage location 3 of the circular-ordered adjacency list of the constitutive point v5 is the address V9, in other words, the constitutive point in question that is adjacent to the constitutive point v5 is the constitutive point v9. The address V9 is accompanied by a storage location number 1, then, the storage location number 1 is subtracted by 1 (one). In the same way, when referring to the storage location 3 of the circular-ordered adjacency list of the constitutive point v9 according to the result 0, it is found that an address placed in the storage location 3 is an address V6. That is, the constitutive point in question that is adjacent to the constitutive point v9 is the constitutive point v6. The address V6 is accompanied by a storage location number 2, then, the storage location number 2 is subtracted by 1 (one). When referring to the storage location 1 of the circular-ordered adjacency list of the constitutive point v6 according to the result 1, it is found that an address placed in the storage location 1 is an address V0. That is, the constitutive point in question that is adjacent to the constitutive point v6 is the constitutive point v0. The address V0 is accompanied by a storage location number 3, then, the storage location number 3 is subtracted by 1 (one). When referring to the storage location 2 of the circular-ordered adjacency list of the constitutive point v0 according to the subtraction result of storage location number, it is found that an address placed in the storage location 2 is an address V3. That is, the adjacent point in question that is adjacent to the constitutive point v0 is the constitutive point v3 specified as the starting point In this way, data for a representation of a surface defined by constitutive points v0, v3, v5, v9 and v6 is extracted for vision and display purpose and may be stored as a separate data file. In the case where the sequence rule is determined to be clockwise circular-order, the storage location number is added by 1 (one).

It is to be noted that, in point data extraction in counterclockwise direction, the reference storage location number 0 indicates the lowest storage location of the circular-ordered adjacency list to be referred to, for example, such as the fourth storage location 4 of the circular-ordered adjacency list of the constitutive point v0. In point data extraction in clockwise direction, the reference storage location number without any real existence indicates the first storage location of the circular-ordered adjacency list to be referred to.

Here, when describing transfer operation to an address of a constitutive point vm placed in a j-th storage location of a circular-ordered adjacency list of a constitutive point vi by using a sign E as below, $$Vm = E[vi(j)]$$

In the expression, vi(j) is the address of the constitutive point vm placed in the j-th storage location of the circular-ordered adjacency list of the constitutive point vi, and E represents transfer operation to an address of the constitutive point vm.

Letting Pj, K and XmodK be a storage location number accompanying an address of a constitutive point vm that is placed in j-th storage location of a circular-ordered adjacency list of a constitutive point vi, the number of adjacent points around the constitutive point vi, and a reminder of division of X by K, respectively, the transfer operation from a constitutive point vi to a constitutive point vm in a counterclockwise direction is given by the following expression:

$$vn = E[vm\{(Pj-1+K-1)modK+1\}] \qquad (I)$$

When using this expression (I), it is not required to consider whether the reference storage location number is 0 or of an unreality.

An area of the partition A of the a geographic area map shown in FIG. 22 can be found as a total of areas of triangles $\Delta Ov0v3$, $\Delta Ov3v5$, $\Delta Ov5v9$, $\Delta Ov9v6$ and $\Delta Ov6v0$ around an arbitrary reference constitutive point O established within the partition A. Even tough the line segment between each adjacency pair of constitutive points is curvilinear, the area of the partition A can be figured out as long as an area of each triangle can be calculated. If the line segment is too complicated to calculate an accurate area, it is possible to figure out the approximate total area of the partition A.

Figure 25:
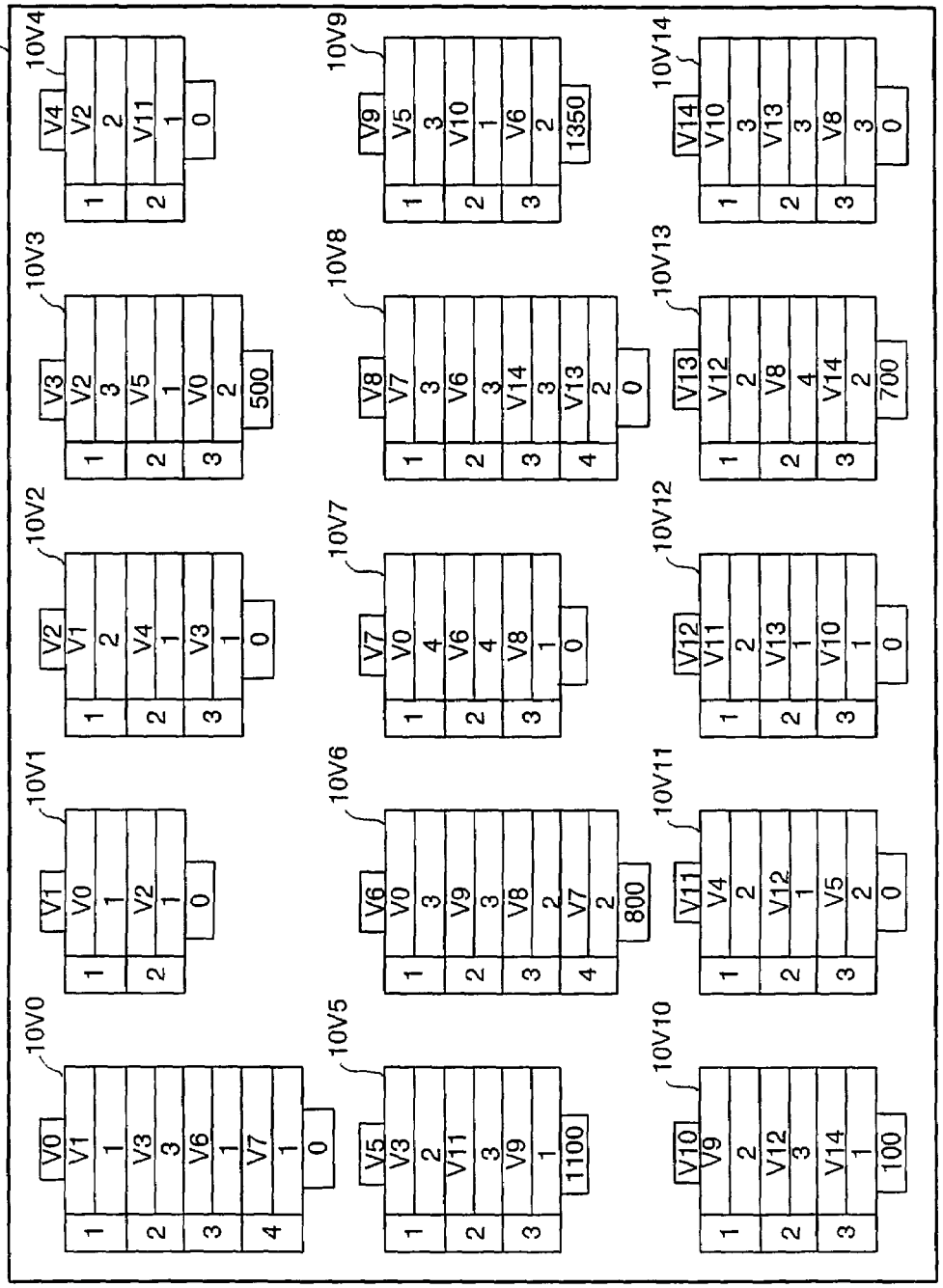
FIG. 25 is a conceptual illustration of the data structure for a graph representation of the geometric area map shown in FIG. 22 which consists of topological and geometric information including storage location information.

FIG. 25 shows a data structure contains information of altitudes or elevations of spots on the geographic area map shown in FIG. 22. The altitude value of a given constitutive point is written as one of attributes of the constitutive point v in the storage area allocated to the constitutive point v. As shown, the constitutive points v3, v5, v8, v9, v10 and v13 have altitudes of 500 m, 100 m, 800 m, 1350 m, 100 m and 700 m, respectively. When creating a 100 m contour map from the data structure, a calculation is made to find a constitutive point 100 meters high between each adjacency pair of constitutive points. For example, if a route between an adjacency pair of constitutive points v0 and v3 is on an up grade, a constitutive point 100 meters high should be located at an in-between position. Since a vertical drop between the constitutive points v0 and v3 is 500 meters, a 100 meters spot elevation is located ⅕ of the distance from the constitutive point v0. In the same manner, constitutive points 100 meters high between the individual adjacency pairs of constitutive points are determined. A 100 m contour map is automatically created by drawing a line connecting a sequence of the constitutive points at 100 meters spot elevations found in this manner. In the case where all of routes run straight sloping at linear grades, the contour map is precise.

Such a contour map can be useful to represent ridge lines and thalweg of mountains, so as to make a significant contribution to reliable prediction where torrents will brake out at due to a downpour of rain. If using the contour map in combination with a whether map, it is possible to provide useful whether information on, for example, danger arrears and/or safe places on heavy regional rainfall. If the geographic area map is applied to an automobile road map with intersections denoted by the constitutive points v0 to v14, it is possible to provide useful traffic information including road situations at intersections or between intersections if having written in data on traffic flows at the intersections as one of attributes of the individual constitutive points in the data structure.

As described above, the data structure of the present invention consists of point data comprising numerical values and pointers of individual constitutive points, so as to require only a small amount of data. This allows computers to perform arithmetic or logical process at a high speed. Besides, the data structure of the present invention is able to comprise data representing various attributes of the individual constitutive points in addition to the point data of the individual constitutive points, it is versatile and of wide application.

Figure 26:
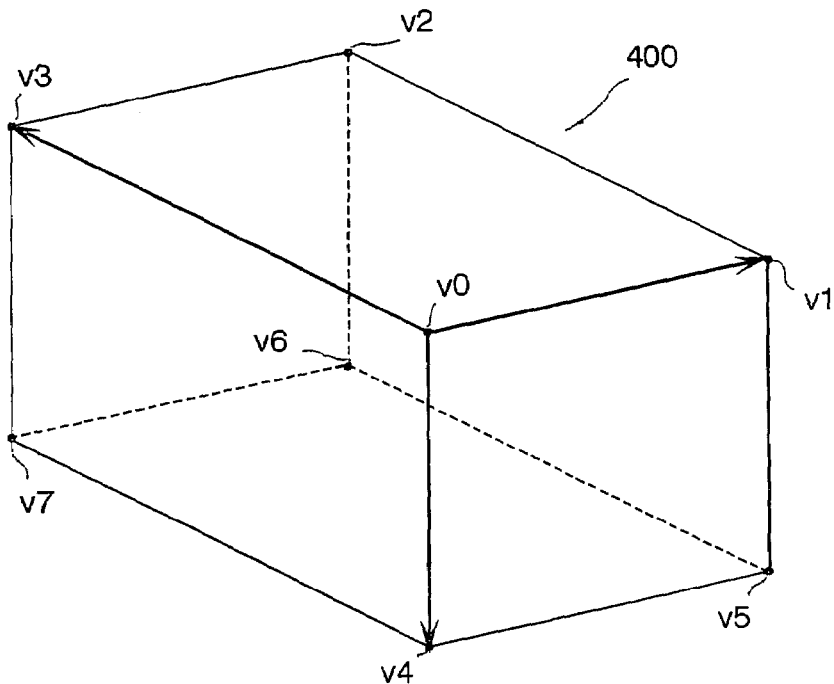
FIGS. 26 and 27 are illustrations for a graph representation and a data structure for the graph representation for explanation of extraction of one of surfaces.
Figure 27:
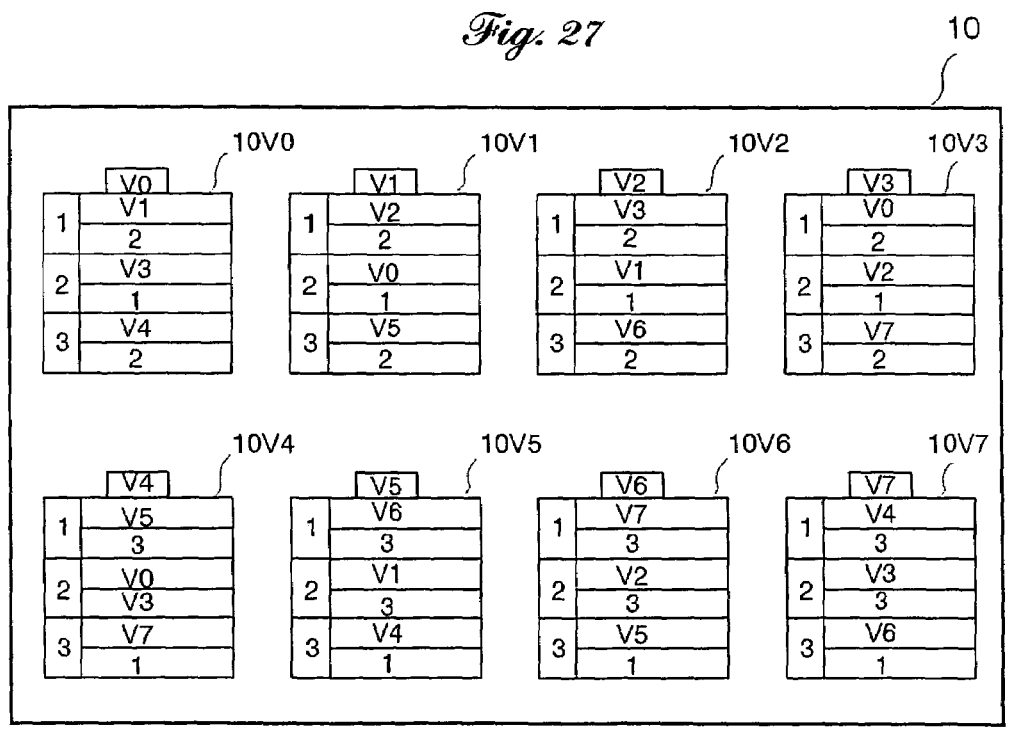

The following description is directed to an example of extracting graphic information of any partition or surface of a polyhedral or three-dimensional object from the data structure of the present invention for vision and display purpose with reference to FIGS. 26 and 27.

FIG. 26 shows a graph representation of a polyhedral or three-dimensional object 400, namely a rectangular solid object having vertices or constitutive points v1, v2, v3, v4, v5, v6 and v7. FIG. 27 illustrates a data structure for a representation of topological information of the polyhedral object 400 shown in FIG. 26. The data structure consists of a set of point data of the individual constitutive points v0 to v7 created in the same manner as described above. When extracting data and creating a data structure for a graph representation of a partition or surface B defined by constitutive point v0, v3, v7 and v4, it is sufficient to specify any one of a number of adjacency pairs of constitutive points that are directly adjacent to each other. Specifically, when extracting data and creating a data structure for a graph representation of the surface B defined by the constitutive point v0, v3, v7 and v4, only an adjacency pair of constitutive points, for example, a constitutive point v3 as a starting point and a constitutive point v0 as an adjacent point to the starting constitutive point v3 in a clockwise direction are specified. At the beginning, when specifying the constitutive point v3, the point data of the constitutive point v3 is copied and an address V0 of the adjacent point v0 in the circular-ordered adjacency list of the constitutive point v3 is referred to. As a result, it is detected that the address V0 of the adjacent point v0 is accompanied by a storage location number 2. Then, in order to find an adjacent point adjacent to the constitutive point v0, a reference storage location number is determined by adding 1 (one) to the storage location number 2. The resultant reference storage location number is 3. In point data extraction in clockwise direction, the reference storage location number without any real existence indicates the first storage location of the circular-ordered adjacency list to be referred to. It is of course that a reference storage location number may be determined by subtracting 1 (one) from a storage location number accompanying an address of a constitutive point specified as an adjacent point to the starting point when point data extraction is in a counterclockwise direction.

This reference storage location number 3 indicates that the adjacent point in question to the constitutive point v0 is indicated by an address written in the third storage location 3 of the circular-ordered adjacency list of the constitutive point v0. That is, it is detected that an address placed in the storage location 3 of the circular-ordered adjacency list of the constitutive point v0 is the address V4, and hence, that the adjacent point in question is the constitutive point v4. The address V4 is accompanied by a storage location number 2 in the circular-ordered adjacency list of the constitutive point v0. Then, after copying the point data of the constitutive point v0, a reference storage location number is determined by adding 1 (one) to the storage location number 2. In the same way, when referring to the storage location 3 of the circular-ordered adjacency list of the constitutive point v4 according to the reference storage location number 3, it is detected that the address placed in the storage location 3 of the circular-ordered adjacency list of the constitutive point v4 is an address V7, and hence, the adjacent point in question is the constitutive point v7. The address V7 is accompanied by a storage location number 1. After copying the point data of the constitutive point v4, a reference storage location number is determined by adding 1 (one) to the storage location number 1. When referring to the storage location 2 of the circular-ordered adjacency list of the constitutive point v7 according to the reference storage location number 2, it is detected that an address placed in the storage location 2 of the circular-ordered adjacency list of the constitutive point v7 is an address V3, and hence, that the adjacent point in question is the constitutive point v3 specified as the starting point. In this way, data for coordinate values and attributes of the respective constitutive points v0, v3, v5, v9 and v6 are extracted for vision and display purpose and may be stored as a separate data structure. It is allowed to specify any point as a starting point in point data extraction, either in counterclockwise direction or in clockwise direction.

Extraction of point data of control points of a curved surface is realized in the same manner as extraction of point data of constitutive points of boundary lines and partitions or surfaces of a polyhedral object. In consequence, it is capacitated to create a data structure for a representation of graphic information of an intricate two- or three-dimensional object which includes a complicated arrangement of planar and curved constitutive surfaces in just the same manner as described above.

Herein, when describing transfer operation to an address of a constitutive point vm placed in a j-th storage location of a circular-ordered adjacency list of a constitutive point vi by using a sign E as below, $$Vm=E[vi(j)]$$

In the expression, vi(j) is the address of the constitutive point vm placed in the j-th storage location of the circular-ordered adjacency list of the constitutive point vi, and E represents transfer operation to an address of the constitutive point vm.

Letting Pj, K and XmodK be a storage location number accompanying an address of a constitutive point vm that is placed in j-th storage location of a circular-ordered adjacency list of a constitutive point vi, the number of adjacent points around the constitutive point vi, and a reminder of division of X by K, respectively, the transfer operation from a constitutive point vi to a constitutive point vm in a counterclockwise direction is given by the following expression:

$$vn=E[vm\{(Pj-1+K-1)modK+1\}] \quad (I)$$

Similarly, the transfer operation from a constitutive point vi to a constitutive point vm in a clockwise direction is given by the following expression:

$$vn=E[vm\{(Pj+1+K-1)modK+1\}] \quad (II)$$

It is also to be noted herein that, in if a reference storage location number 0 (zero) or without any real existence indicates the lowest storage location or a first storage location of the circular-ordered adjacency list to be referred to, respectively.

The data structure represents transfer operation for deriving a constituting point in question by tracing one adjacent point once using a sign E, so that operation for point data extraction along boundary lines of surfaces in clockwise or counterclockwise direction that is used so often in performing arithmetic or logical data process of a polyhedral object should be done once for all, and, in consequence, no troublesome work is required.

Figure 28:
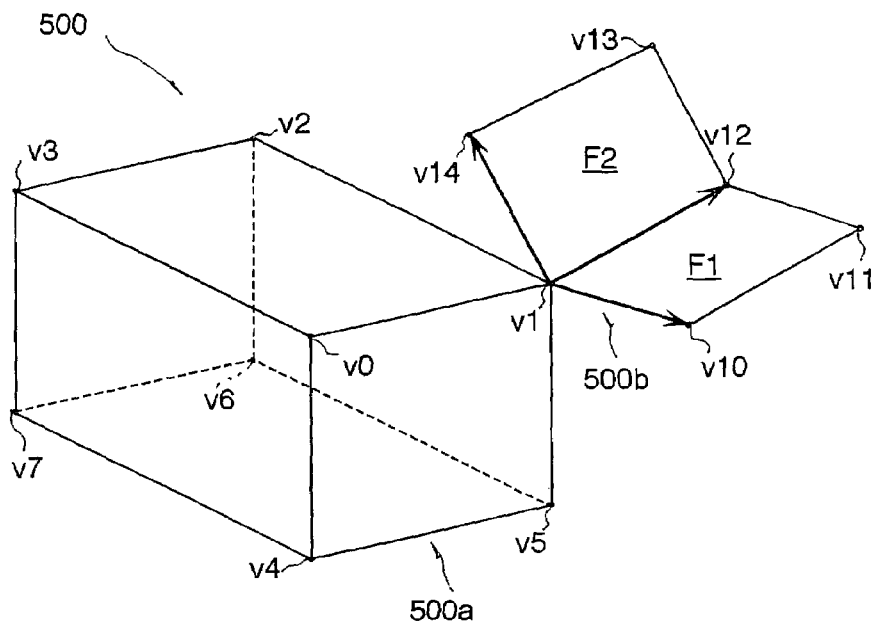
FIG. 28 is a graph representation of a non-manifold object.
Figure 29:
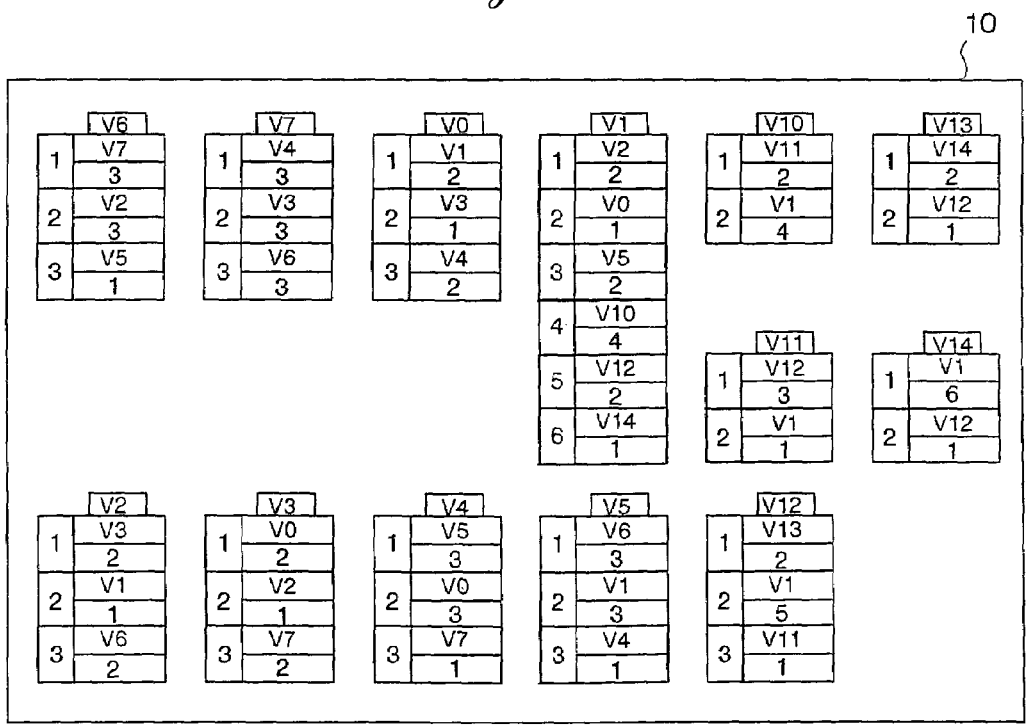
FIG. 29 is a conceptual illustration of a data structure for a graph representation of the non-manifold object shown in FIG. 26.

FIGS. 28 and 29 show another example of extracting point data for a representation of graphic information of a partition or surface of what is called a non-manifold object that comprises a closed solid part and an open part from a data structure for a representation of a graph information of the non-manifold object.

FIG. 28 shows a graph representation of a non-manifold object 500 comprising a graph part 500*a* having constitutive points v0 to v7 and a graph part 500*b* having constitutive points v0 and v10 to v14 which share the constitutive point v1. FIG. 29 illustrates a data structure for a representation of topological information of the non-manifold object 500 shown in FIG. 28. The data structure consists of a set of point data of the individual constitutive points created in the same manner as described above. The individual constitutive points, except the common constitutive point, are represented by the same circular-ordered adjacency lists as described above, respectively. Since the graph part 500*b* has no a closed region, it is impossible to determine the order of adjacency in clockwise or counterclockwise direction as viewing from outside the graph. The adjacent points around the constitutive point v1 may be expediently sequenced in order of v10, v12 and v14 or in order of v10, v14 and v12. In the case of the order of v10, v12 and v14, when extracting point data of the constitutive points v1, v3, v10, v11 and v12 forming a partition or surface F1 of the graph part 500*b* in a counterclockwise direction, the expression (I) can be available. In the expression (I), K is the number of constitutive points of the partition F1.

As shown in FIG. 29, the adjacency list of the constitutive point v1 is composed of a circular-ordered adjacency list (upper three storage locations numbered 1 to 3) and an unordered adjacency list (lower three storage locations numbered 4 to 6). When extracting point data of the constitutive point v11 subsequent to the constitutive points v1 and v10 in a counterclockwise direction as viewed in a direction indicated by an arrow Y, the transfer operation to the constitutive point v11 is given by the following expression:

$$v11=E[v10\{(Pj-1+K2-1)modK2+K1+1\}] \quad (III)$$

In the expression (III), K1 and K2 are the numbers of adjacent points around the constitutive point v1 involved in the graph part 100Da and the graph part 100Db, respectively, and Pj is the storage location number accompanying the address of the adjacent point v10 in the ordered adjacency list of the constitutive point v1. In this manner, the transfer operation to a following constitutive point is automatically performed in order.

Figure 30:
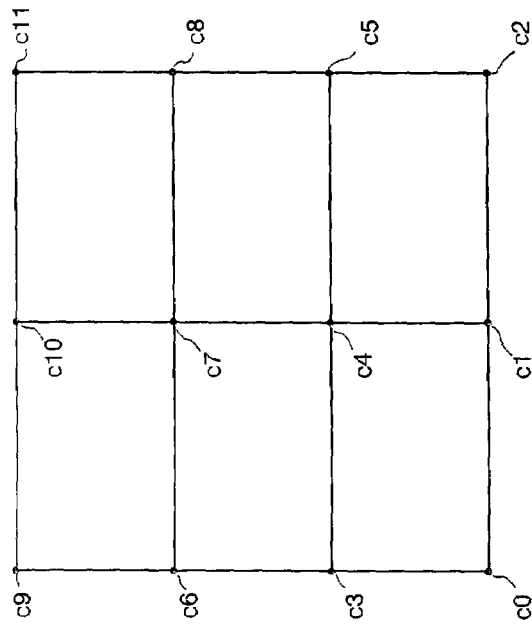
FIGS. 30 and 31 are illustrations for a lattice pattern representation and a data structure for the lattice pattern representation for explanation of extraction of a consequence of lattice points.
Figure 31:
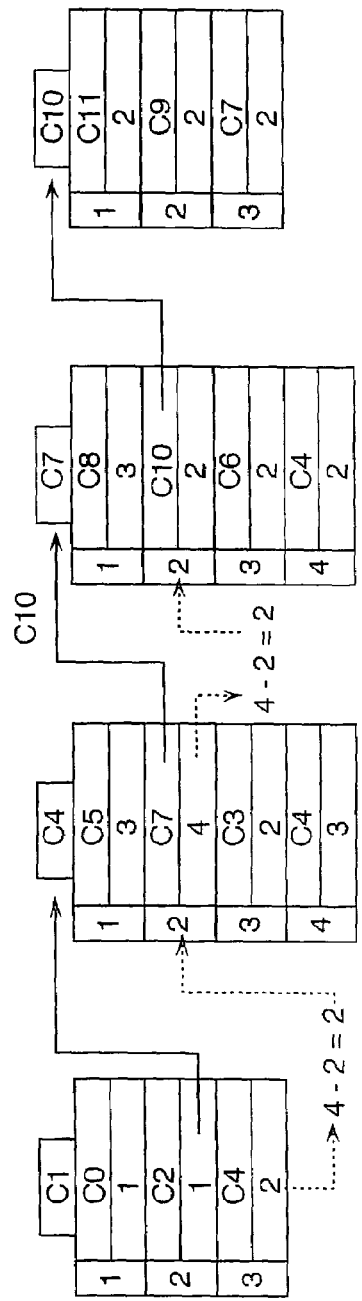

FIGS. 30 and 31 are explanatory views showing an example of extracting point data of constitutive points forming lattice points of a lattice pattern. FIG. 30 shows a lattice pattern having lattice points c1 to c11. FIG. 31 illustrates a data structure for a representation of topological information of the lattice pattern shown in FIG. 30 in which only circular-ordered adjacency lists necessary for explanation of data extraction are depicted. Extracting point data of a sequence of constitutive points forming the lattice points c1 as a starting point, c4, c7 and c10 is performed basically in the same manner as described above. However, in this case, a reference storage location number that is referred to find the following adjacent point is determined by subtracting 2 (two) from or adding 2 (two) to a storage location number accompanying address data of a preceding adjacent point. Specifically, when finding an adjacent point adjacent to the constitutive point c4, a reference storage location number is determined by, for example, subtracting 2 from the storage location number 4 accompanying the address data c4 in the third storage location 3 of the circular-ordered adjacency list of the constitutive point c1. When referring to an address data in the second storage location 2 of the circular-ordered adjacency list of the constitutive point c4 in accordance with the reference storage location number 2, it is found that the following adjacent point in question is the constitutive point c7. In this manner, point data of the sequence of adjacent points c1, c4, c7 and c10 are sequentially extracted.

The reference storage location number indicates a circularly ordered storage location. Therefore, if the circular-ordered adjacency list has four storage locations, a reference storage location number 6 indicates the storage location second from the highest storage location (the first storage location) in the case of additional type reference storage location number. On the other hand, in the case of subtractive type reference storage location number, a reference storage location number 0 indicates the storage location just before the highest storage location (the first storage location), namely the lowest storage location.

Extraction of point data of constitutive points forming a vertical or horizontal sequence of lattice points of a lattice pattern is a necessary process toward creation of a curved surface.

Figure 32:
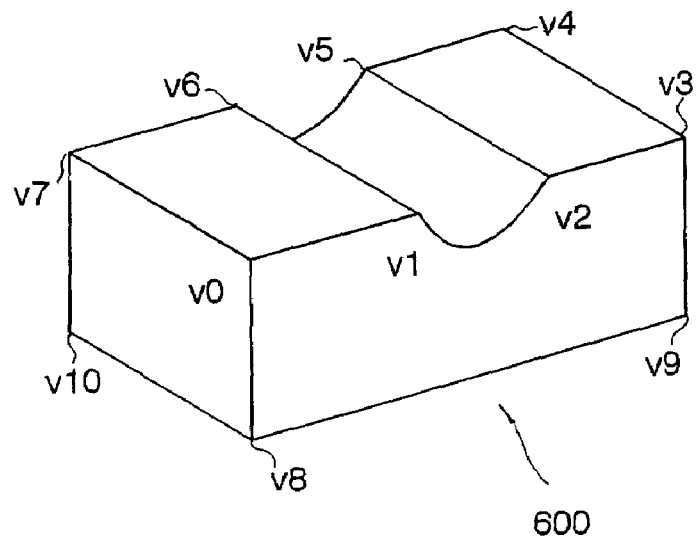
FIG. 32 is a graph representation of a three dimensional solid object having a half-rounded surface.
Figure 33:
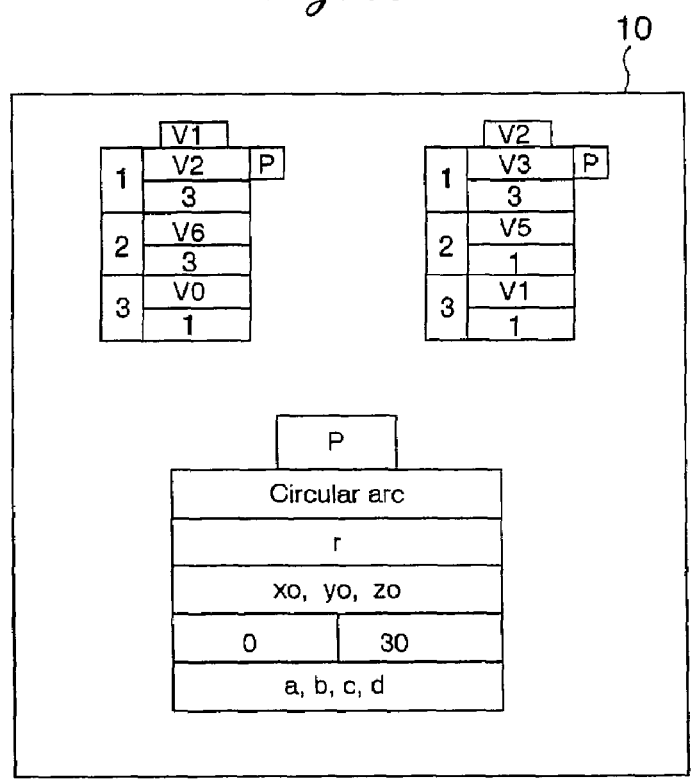
FIG. 33 is a conceptual illustration of a data structure for the graph representation of the three-dimensional solid object shown in FIG. 32.
Figure 34:
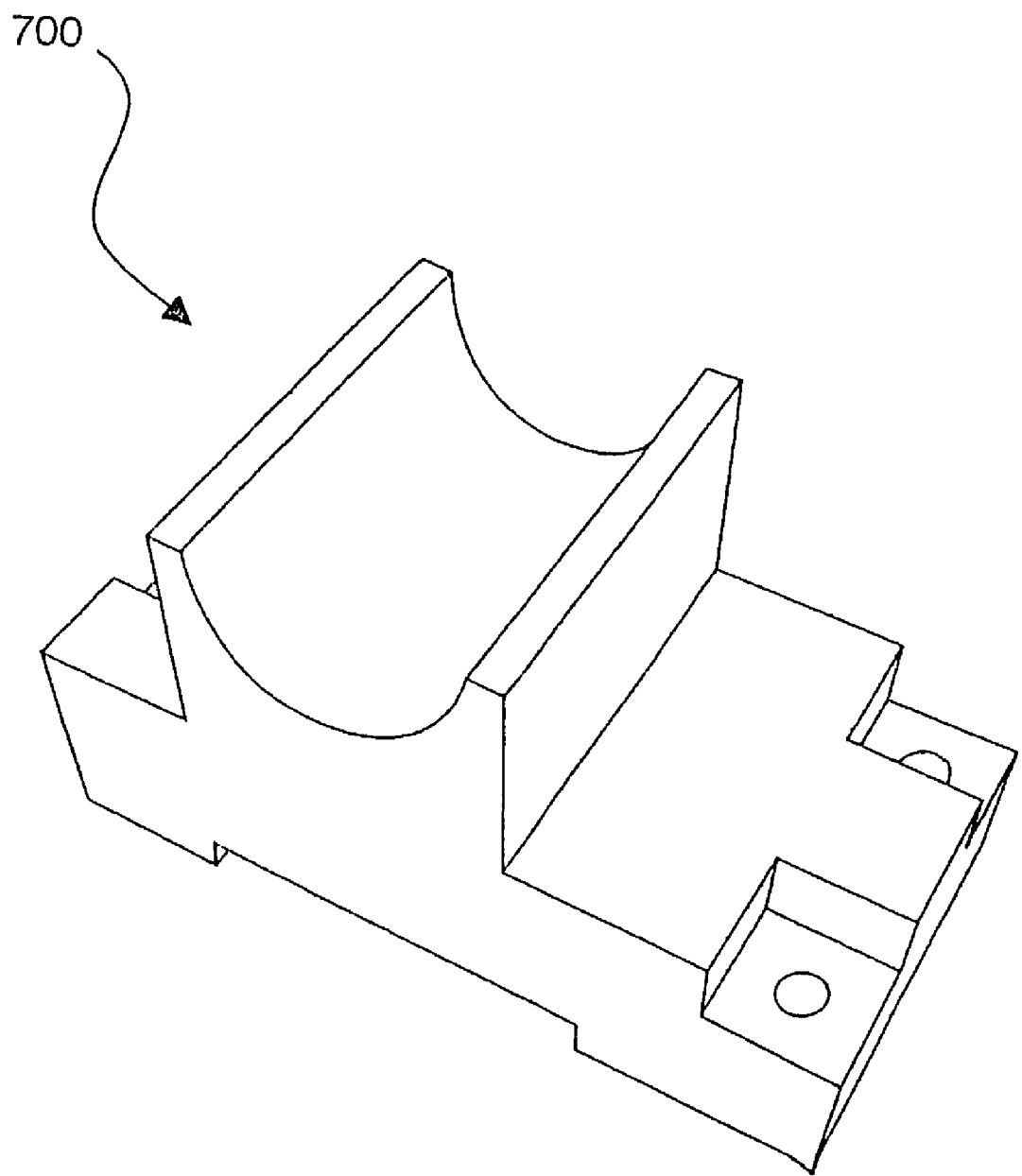
FIGS. 34 and 35 are illustrations for explaining modeling steps of an industrial product for examination of storage requirement of the data structure.
Figure 35:
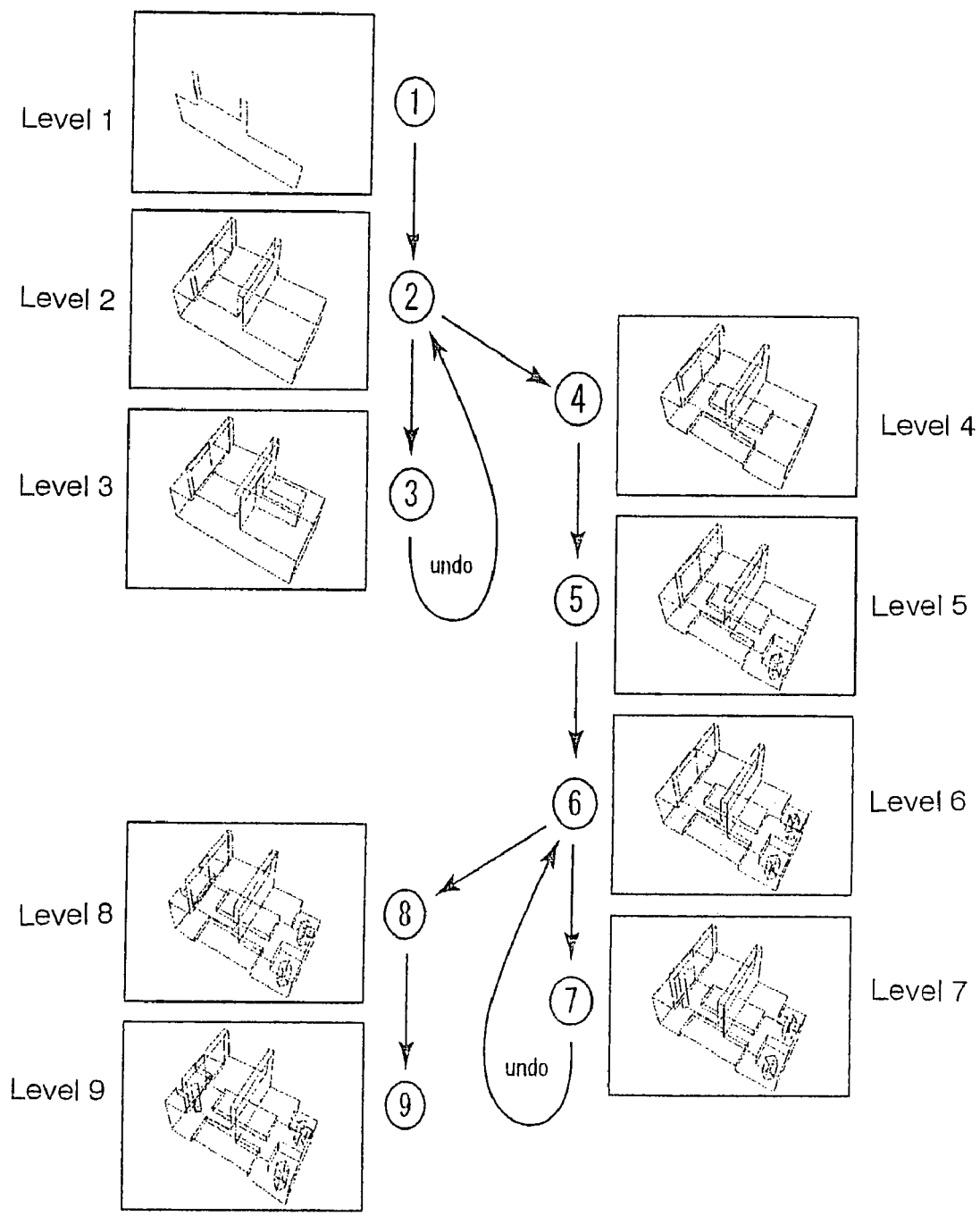

FIGS. 32 and 33 are explanatory views showing an example of a data structure for a representation of graphic information of a three-dimensional or solid object 600. As shown in FIG. 32 a graph of the solid object 600 has constitutive points v1 to v10 (a $11^{th}$ constitutive point is hidden). The individual constitutive points, except the constitutive points v1, v2, v5 and v6 defining a half-round bore, are described by the same circular-ordered adjacency lists as described above, respectively. FIG. 35 shows a conceptual illustration of a data structure for a representation of graphic information of the solid object 500 in which only circular-ordered adjacency lists of the constitutive points v1 and v2 and an attribution list relevant to these constitutive points v1 and v2 are shown for simplicity. As apparent from the circular-ordered adjacency list, the constitutive point v1 assigned an address V1 has adjacent points v2, v6 and v0 around the constitutive point v1 in counterclockwise circular order. Similarly, the constitutive point v1 assigned an address V2 has adjacent points v3, v5 and v1 around the constitutive point v2 in counterclockwise circular order. The constitutive points v1 and v2 are correlated with each other with attributes placed at a storage area assigned an address P. In the storage area having the address P, data representing attribute information of the line segment between the adjacent pair of constitutive points v1 and v2 is written. That is, the attribute information describes that a line segment connecting the constitutive points v1 and v2 is a circular arc that is drawn with its center at a point having coordinates xo, yo and zo and with a radius of r, that the circular arc is in a plane defined by an algebraic expression, ax+by+cz=d, and that angles of the circular arc at a starting point and an end point are 0° and 30°, respectively.

In regard to graphs given by algebraic functions such as a sphere or a circle which has no adjacent points, it is only the thing to locate arbitrarily a point in the graph. Point data of the point may consist of a pointer as an attribute to pointer for referring to an address of a storage location in which algebraic functions are written and ha no need of adjacency information.

Here a comparison of storage requirements for a representation of a polyhedral solid object is made between the data structure of the present invention and the half-edge data structure that is one of typical conventional data structures for a graph representation. In the following description, the storage requirement is treated of in terms of a minimum storage requirement theoretically required. Because programmers customarily make it a practice to provide an executable program with various redundancy, it is essential to compare storage requirements for a polyhedral solid object represented by these two data structure.

Half-edge Data Structure:

(1) Storage Requirement for Edges:

The half-edge data structure allots a storage requirement for information on 12 elements (three edges pccw, pcw and e, two vertices pv and nv, and one surface pf on one side of al reference edge e and three edges ncw, nccw and e', two vertices pv' and nv', and one surface nf on the other side). The information is represented by pointers to addresses at which information of the individual points are written, so that a storage requirement per pointer is four bytes. Accordingly, a total storage requirement in bytes Ne for information on all constitutive edges of the polyhedral solid object considered is given by the following expression:

$$Ne=4\times12ne=48ne$$

where ne is the number of constitutive edges of the polyhedral solid object considered.

(2) Storage Requirement for Vertices:

A geometrical position of vertex is given by three-dimensional coordinates, x, y and z. The half-edge data structure requires four bytes for coordinate values of each constitutive vertex that are floating point numbers. Accordingly, a total storage requirement in bytes Nv for coordinate values of all constitutive vertices of the polyhedral solid object considered is given by the following expression:

$$Nv=4\times3nv=12nv$$

where nv is the number of constitutive vertices of the polyhedral solid object considered.

Although the executable program is ordinarily created so as to involve pointers to surfaces and edges in the data structure in addition to the coordinates, these are unconsidered in view of the minimum storage requirement.

(3) Storage Requirement for Surfaces:

A pointer is essential for referring to one of edges from a surface. In consequence, a total storage requirement in bytes Nf for information on all constitutive surfaces of the polyhedral solid object considered is given by the following expression:

$$Nf=4nf$$

where nf is the number of constitutive surfaces of the polyhedral solid object considered.

The storage requirement in bytes Nh for a representation of the polyhedral solid object considered is given by the following expression:

$$Nh=48ne+12nv+4nf$$

The following relation which is called Euler number holds between the numbers of vertices (nv), edges (ne) and surface (nf) of the polyhedral solid object without bores considered:

$$nv+nf-ne=2$$

Since, when the numbers of vertices (nv), edges (ne) and surface (nf) increase, the right side member, a constant 2, is regarded as minimal as negligible, the relation can be approximated as below.

$$ne=nv+nf \qquad (1)$$

Although the correlation between the numbers of vertices (nv) and surfaces (nf) is impossible to be analytically found, when roughly estimating the number of surfaces to be 1.5 times as much as the number of vertices, the storage requirement of the half-edge data structure is given as below.

$$Nh=48ne+12nv+4\times1.5nv=48ne+18nv \qquad (2)$$

Submitting the expression (1) into the equation (2), one obtains the following expression:

$$Nh=48ne+7.2ne=55.2ne$$

It turns out from the above consideration that the half-wedge data structure requires at least 55.2ne bytes for a representation of the polyhedral solid object without bores considered.

Data Structure of the Present Invention:

The following consideration is directed to the data structure of the present invention containing no attribution information for simplicity.

(1) Storage Requirement for Constitutive Points:

The data structure of the present invention has the same storage requirement for coordinates of constitutive points as the half-edge data structure. That is, a total storage requirement in bytes Nv for all constitutive points of a polyhedral solid object considered is given by the following expression:

$$Nv=4\times 3nv=12nv \quad (3)$$

where nv is the number of constitutive points of the polyhedral solid object considered.

(2) Storage Requirement for Circular-Ordered Adjacency List:

The number of adjacent points is just two times as much as the number of line segments. As four bytes are required for each element or constitutive point, a total storage requirement in bytes Nn for adjacent points is given by the following expression:

$$Nn=2ne\times 4=8ne \quad (4)$$

where ne is the number of constitutive line segments.

In the case where a constitutive point considered has less than 256 adjacent points, as a storage requirement per storage location number is one byte, a total storage requirement in bytes Np for storage location numbers is given by the following expression:

$$Np=2ne \quad (5)$$

The storage requirement in byte Nc is given by the following expression:

$$Nc=12nv+8ne+2ne=14.8ne$$

It is proved that the storage requirement of the data structure of the present invention is less than 27% of the half-edge data structure.

In the case where a constitutive point considered has more than 256 but less than 65,536 adjacent points, as a storage requirement per storage location number is two bytes, a total storage requirement in bytes Np for storage location numbers is given by an expression of Np=4ne. Therefore, the storage requirement of the data structure of the present invention is approximately 33% of the half-edge data structure. However, polyhedral solid objects such as including a constitutive point having 65,536 adjacent points are ordinarily unimaginable, so that there is no question as to the storage requirement of the data structure of the present invention that does not in any way exceed 33% of the half-edge data structure.

The inventors of the present application examined storage requirements of these two data structures with running executable programs in a computer in consideration of the need of redundancy. As a result, the storage requirement of the data structure of the present invention for a representation of graphic information of a polyhedral solid object was one-third that of the half-edge data structure for the same.

Figure 37:
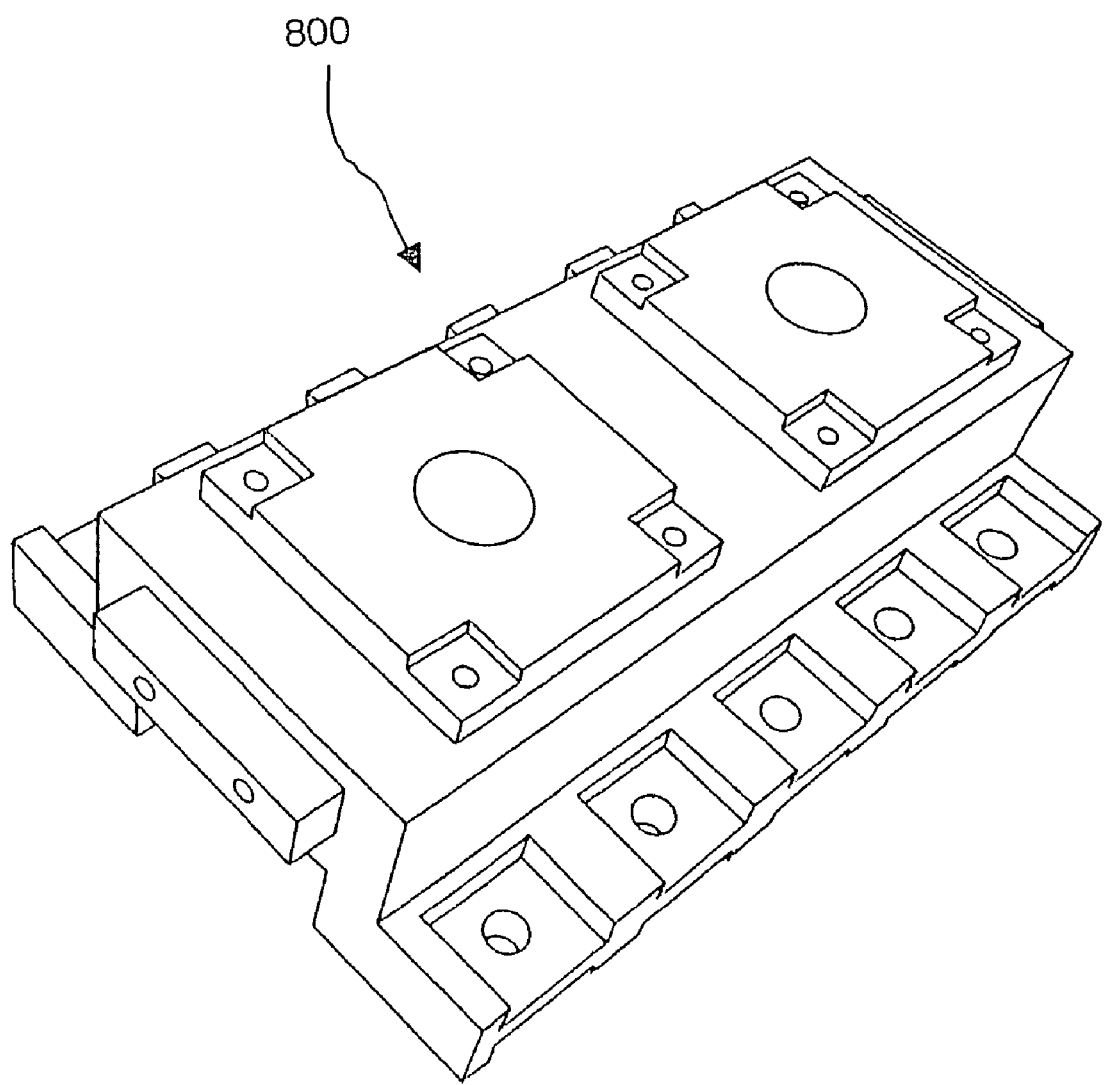
FIG. 37 is a graph representation of an industrial product for examination of storage requirement of the data structure.

Further, the inventors of this application examined how the storage requirements of the data structure of the present invention increases when completing a graph representation of a polyhedral solid object 700 shown in FIG. 37 through alteration levels 1 to 9 shown in FIG. 35. First of all, a two-dimensional graph of a side surface 50 of the intended product is created in a first alteration level 1. The two-dimensional graph of a side surface 51 is altered to a three-dimensional graph y sweeping the surface graph in a second alteration level 2. The three-dimensional graph is altered by forming a platform 52 in a third alteration level 3. The graph s backed down on. The graph provided at the alteration level 3 is retrieved and then altered by forming a groove 54 in the base in a fourth alteration level 4. The graph is further altered by forming a counter recess 56 and a bore 58 in the counter recess 56 in a fifth alteration level 5 and further by forming a counter recess 60 and a bore 62 in the counter recess 60 in a sixth alteration level 6. Subsequently, the graph is altered by forming a vertical bore (not shown) in a seventh alteration level 7. The graph is backed down on and the graph provided at the alteration level 6 is retrieved. The graph is further altered by forming a square recess 64 in an eighth alteration level 8. Finally, the graph is further altered by changing the top surface of the square surface to a half-round surface in a ninth alteration level 9.

As previously described in conjunction with FIGS. 9A to 9C and 10A to 10C, the first to ninth alteration levels are correspondingly referred to as alteration levels 0 to 8, respectively. Point data of individual constitutive points defining the respective altered graphs are added at every alteration as shown in FIGS. 10A to 10C.

Figure 36:
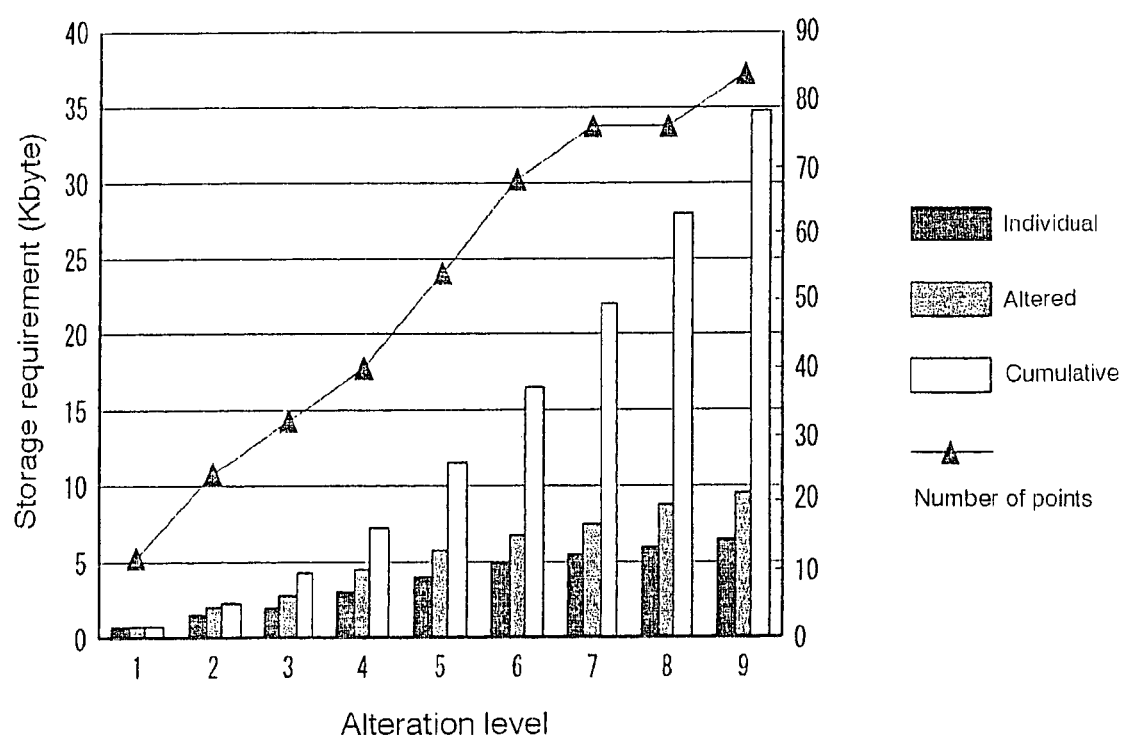
FIG. 36 is a chart showing a transitional change in storage requirement of the data structure for graph representations during modeling a polyhedral solid object shown in FIG. 34.

FIG. 36 shows a transitional increase in storage requirement of the data structure for an increase in the number of constitutive points due to alterations of a graph with respect to alteration levels. In this chat, "individual," "alteration" and "cumulative" bars shows storage requirements for data of an individual graph itself obtained at a relevant alteration level, for data of a graph including alterations made until a relevant alteration level, and all individual graphs until a relevant level, respectively. Triangular sign shows the number of constitutive points of an individual graph at a relevant alteration level. As proved from the chart an increase in storage requirement per alteration is in a range of from 30 to 50%. A large increase in storage requirement is caused due to retractions of work. Further, an examination has revealed that the storage requirement of the data structure of the present invention is more than double that of the half-edge data structure for representations of graph alterations for modeling the same polyhedral solid object.

Figure 38:
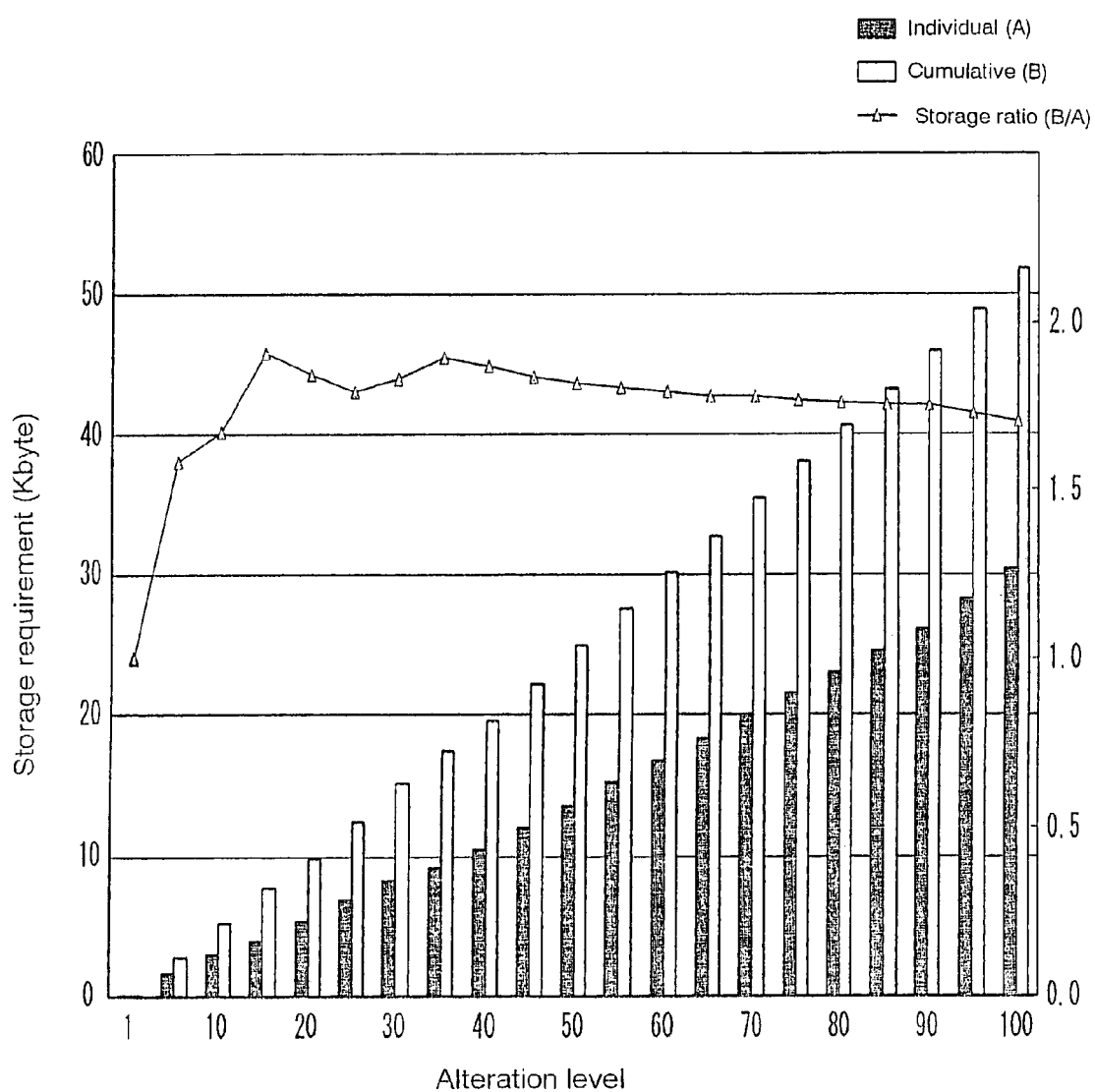
FIG. 38 is a chart showing a transitional change in storage requirement of the data structure for graph representations during modeling the an industrial product.

FIG. 38 is a chart showing the result of a similar examination as to a storage requirement of the data structure for graph representations of alterations for modeling a polyhedral solid object 800 shown in FIG. 37 through 100 alteration levels. In this chart, "individual" and "cumulative" bars shows storage requirements for data of an individual graph itself obtained at a relevant alteration level and data of a graph including all alterations made until a relevant alteration level, respectively. Triangular sign shows a ratio of cumulative storage requirement to individual storage requirement. It is proved from the chart that, although the individual storage requirement increases with progress in alteration level, the cumulative storage requirement is relatively low.

As turned out from the above examinations, the present invention demands a small storage requirement even for a graph representation including all alterations made that is significantly less than the half-edge data structure. In other words, the data structure of the present invention can represent a graph information including all alterations made with a storage requirement equivalent to that of the half-edge data structure for a representation of individual graph information.

For easy understanding, differences in feature between the two data structures are shown in the following table.

|  | Half-edge data structure | Data structure of the present invention |
| --- | --- | --- |
| Storage requirement | 1 | ⅓ |
| Data processing speed per a Graph | 1 | More than double |
| Alteration procedure | Performed by re-entry of commands or reverse operation | Realized with attribute data |
| Alteration data saving | Separate command history | Within graphic data |
| Alteration tracing | With redo/undo commands Processing time depends on alterations made | With alteration level index Instantaneous access to any alteration of any point |
| Editing of alteration history | By command editing (troublesome job required) | Easy |
| Storage requirement for Alteration | Practically impossible to hold alteration information in graphic information | No commands are required. Storage requirement is small. |
| Storage requirement after 100 alterations | 50 times as much as individual graph (150 times as compared with the data structure of the present invention) | Cumulative storage requirement is less than doable with respect to individual graph |
| 3-D graph comprising planar component surfaces | Adaptive | Adaptive |
| Simultaneous representation of 2-D and 3-D graphs both comprising planar component surfaces | Inadaptable | Adaptive |
| Simultaneous representation of 2-D and 3-D graphs both comprising curved component surfaces | Inadaptable | Adaptive |
| Representation of 2-D or 3-D graphs both comprising planar and curved component surfaces | Strictly inadaptable (Requires special process for interface between planar and curved surfaces) | Adaptive |
| Graphic data compatibility | Difficult | Easily performed |
| Conversion between 2-D and 3-D graphs | Impossible | Possible |
| Interfirm data compatibility | Complete intercommand translation is difficult | Easy |
| Time requirement for software development | Thousands of ma-hours | Moderate |

Although the present invention has been described in conjunction with a digital camera by way of embodiment, it is embodied in various electronic imaging systems including digital video cameras and cellular phones having image entry features. Further, various other embodiments and variants may occur to those skilled in the art, which are within the scope and spirit of the invention, and such other embodiments and variants are intended to be covered by the following claims.

What is claimed is:

1. A storage medium readable by a computer or processor-controlled machine and having recorded thereon a computer program configured to instruct a computer to read and write a data structure into a memory, the data structure representing a graph of topological and geometrical information of a two- or three-dimensional object, said graph being composed of individual points and line segments connecting adjacent pairs of said points, respectively, comprising:

a set of point data for each of said individual points of said graph representing said topological and geometrical information of said two- or three-dimensional object, said point data of each said point comprising i) an adjacency list written in a storage area of said memory individually allocated for each point, and ii) an information defining a log of alteration levels, wherein a plurality of adjacent points, associated with said point, with address pointers to storage areas allocated to each of said adjacent points, respectively, are written in said adjacency list, said adjacent points having a sequential order in said adjacency list according to a predetermined rule, wherein a storage location number is written for each address pointer of each adjacent point in said adjacency list, said storage location number indicating where, with respect to the sequential order of an adjacency list of the adjacent point indicated by the address pointer, an address pointer to said storage area allocated to said point is written, wherein information on a current alteration level of said graph is written in said data structure and incremented with each alteration to said graph, wherein information on the log of alteration levels of each of said points is written as an alteration history level in said point data for each point, and wherein a new alteration history level, having a value representing the current alteration level incremented by one with said alteration, assigned only to each of said individual points of said graph affected by said alteration.

2. The storage medium according to claim 1, wherein said predetermined rule is a circular order in one of a clockwise direction and a counterclockwise direction with a center on said each said point as viewed from outside of said graph.

3. The storage medium according to claim 1, wherein said point data of each said point contains information of attributes of at least one of said point and said line segment connecting said point with said adjacent point.

4. The storage medium according to claim 3, wherein said attributes of said point include at least one of coordinate values, a type of shape, a color, a type of manipulation of said point, a function of said point as a control point of at least one of a spline curve, a B-spline curve, Bezier curve, a Non-Uniformed Rotational B-spline (NURBS) curve, a subdivision curve and a free curve other than said B-spline, Bezier and NURBS curves.

5. The storage medium according to claim 3, wherein said attributes of said line segment include at least one of a type and a color of line, a definition equation of curve, a domain of a curve to which a constant or a variable of said definition equation is applied and a type of curve that is one of a spline curve, a B-spline curve, Bezier curve, a Non-Uniformed Rotational B-Spline (NURBS) curve, a subdivision curve and a free curve other than B-spline, Bezier and NURBS curves.

6. The storage medium according to claim 1, wherein said data structure retains point data for all of alteration levels of said graph.

7. The storage medium according to claim 1, wherein point data of a new point added to said graph is assigned the same alteration level as said current alteration level of said graph at said addition of point.

8. A method for representing topological and/or geometrical information of a two- or three-dimensional object as points and line segments connecting adjacent pairs of points in a storage medium capable of being accessed and read by a computer or a processor-controlled machine, the method comprising the steps of:

storing, in a storage medium accessible and readable by a computer or a processor-controlled machine, a point data for a constitutive point of a set of points defining a two- or three-dimensional graphical object, the point data defined by a point data structure, wherein the point data structure comprises i) coordinate data describing a graphical location of said constitutive point of the graphical object, ii) adjacency data of said constitutive point, and iii) an alteration history information of said constitutive point, wherein the adjacency data describes at least one adjacent point of the graphical object, the adjacent point being i) directly adjacent to said constitutive point, ii) connected to said constitutive point by a line segment iii) the line segment is free of any intervening points, and iv) each adjacent point stored in an adjacency list having a sequential order according to a predetermined rule, and wherein the predetermined rule requires that a sequential storage location of each adjacent point within the sequential order of the adjacency list increases sequentially based on a local position of each adjacent point in a circle surrounding said constitutive point, a storage location value of each adjacent point corresponding to the sequential storage location in the adjacency list increasing with the local position of each adjacent point in one of a clockwise direction around the circle and a counterclockwise direction around the circle, wherein the adjacency data, for each adjacent point stored therein, further comprises a storage location number corresponding to each adjacent point, the storage location number indicating a storage location value of an address of said constitutive point stored within an adjacency data of a point data describing the adjacent point stored on the storage medium, and wherein the alteration history information comprises an alteration history level of said point data corresponding to each change to the set of points defining the two- or three-dimensional graphical object, the alteration history level stored with each constitutive point.

9. The method according to claim 8, wherein said point data is assigned a storage area in said storage medium having a distinctive address corresponding to said storage area, said storage area having sufficient storage capacity to accommodate said point data.

10. The method according to claim 8, wherein every point of the set of points is stored in the storage medium as a point data defined by the point data structure.

11. The method according to claim 8, further comprising the step of:

storing a current data structure alteration level of said graph in a storage location of the storage medium.

12. The method according to claim 11, further comprising the step of:

altering the set of points of the graphical object, said altering step comprising the sub-steps of:

incrementing a value of the current data structure alteration level by 1, storing a new point data corresponding to an alteration to the set of points and having said point data structure, assigning the incremented value of the data structure alteration level to an alteration history information of the new point data, storing a new adjacency data to any existing point data corresponding to points of the set of points that are adjacent to the alteration to reflect the new point data, and assigning the incremented value of the data structure alteration level to an alteration history information of the new adjacency data, wherein any existing point data not corresponding to points of the set of points of the graphical object adjacent to the alteration point are free from being assigned an alteration history level to the incremented value of the data structure alteration level.

13. The method according to claim 12, further comprising the step of:

where the alteration corresponds to deleting a point of the set of points of the graphical object, assigning an end label to the alteration history information of the new point data.

14. The method according to claim 8, wherein the point data structure further comprises information of attributes of any of said constitutive point and the line segment connecting said constitutive point to the adjacent point, said information of attributes being stored in said storage medium with said point data.

15. The method according to claim 14, wherein the information of attributes of said constitutive point include at least one of i) a type of shape, ii) a color, iii) a type of manipulation of said point, and iv) a function of said point as a control point of at least one of a spline curve, a B-spline curve, Bezier curve, a Non-Uniformed Rotational B-Spline (NURBS) curve, a subdivision curve, and a free curve other than said B-spline, Bezier, and NURBS curves.

16. The method according to claim 14, wherein the information of attributes of said line segment includes at least one of i) a type of line, ii) a color of line, iii) a definition equation of curve, iv) a domain of a curve to which a constant or a variable of said definition equation is applied, and v) a type of curve that is one of a spline curve, a B-spline curve, Bezier curve, a Non-Uniformed Rotational B-Spline (NURBS) curve, a subdivision curve, and a free curve other than said B-spline, Bezier, and NURBS curves.

17. A computer storage medium, readable by a computer or processor-controlled machine, tangibly embodying a program of instructions executable by the computer to execute the steps according to claim 8.

18. A computer-readable data storage medium having stored thereon a computer program configured to instruct a computer to read and write a computer readable graphic data into a memory for use with a graphic drawing program, said graphic data representing a graph of a two- or three-dimensional object composed of individual points and of line segments connecting adjacent pairs of the individual points, the graphic data comprising:

a set of point data for each individual point of said graph, said set of point data representing i) point information of said two- or three-dimensional object and ii) alteration history data indicating a current alteration level of said graph, said alteration level incremented with each alteration to said graph, and said point data of each point i) comprising coordinates, adjacency data, and alteration data of said point and ii) written in a point storage area of said storage medium individually allocated to said point, wherein said adjacency data comprises stored addresses to storage areas respectively allocated to each of a plurality of adjacent points of said graph, said adjacent points being adjacent to said point, and said stored addresses of said adjacency data having i) a predetermined sequential order in said point storage area, and ii) a storage location number associated with each of said stored addresses, said storage location number indicating where, with respect to the predetermined sequential order of a first adjacent point indicated by a first stored address, a second stored address to said storage area allocated to said point is written, and wherein the alteration history data comprises a log of alteration history levels of said point written in said storage area and associated with each individual point, a new alteration history level being assigned to said individual point of said graph only if said individual point is affected by said alteration, said new alteration history level having a value representing the current alteration level.

* * * * *